Dec. 4, 1951 W. W. FRITSCHI ET AL 2,577,614
VOICE-FREQUENCY SIGNALING SYSTEM
Filed Oct. 29, 1948 7 Sheets-Sheet 1
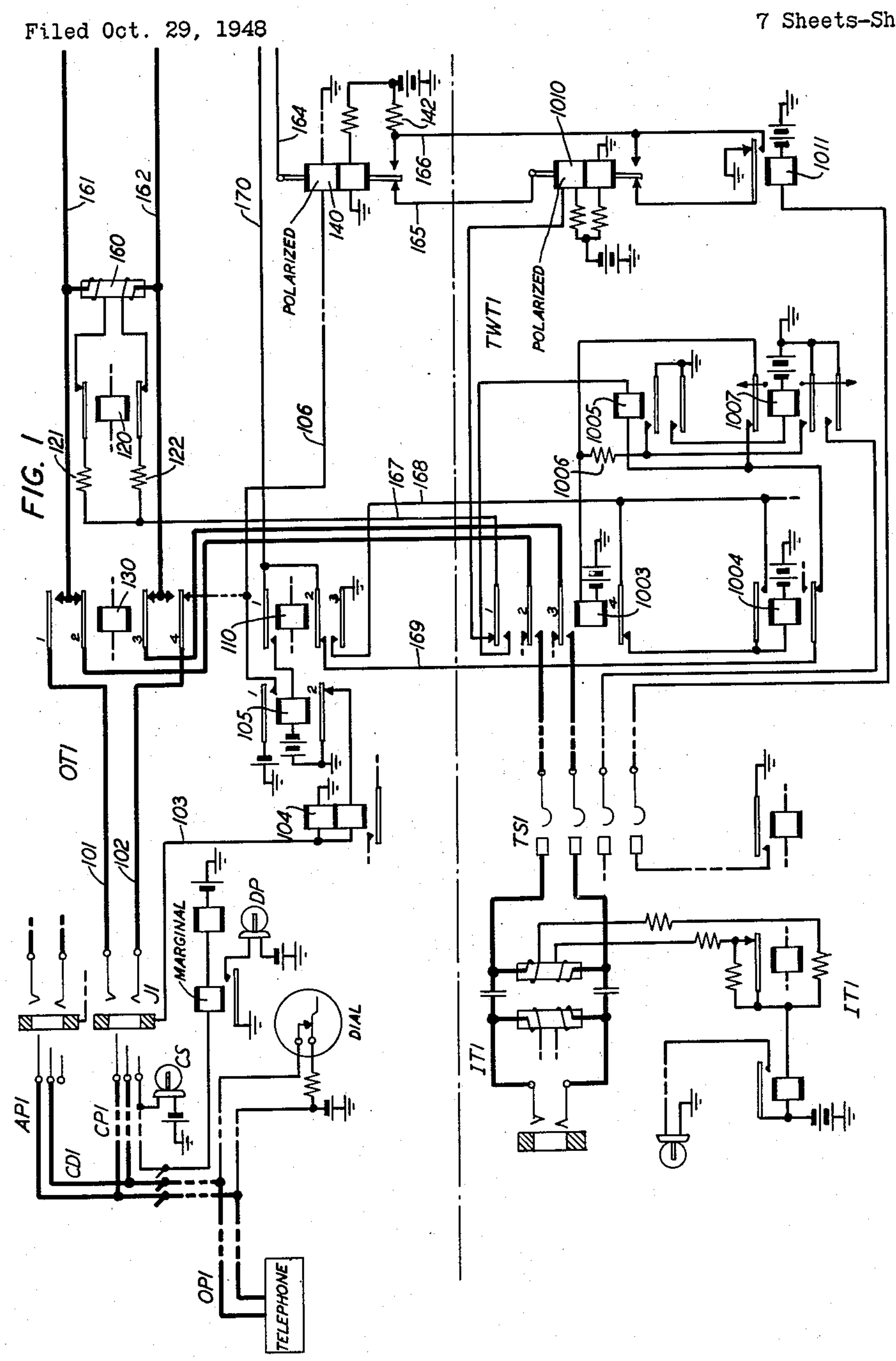
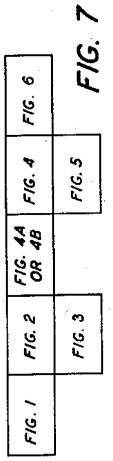
INVENTORS: W. W. FRITSCHI
C. W. LUCEK
BY P. C. Smith
ATTORNEY

VOICE-FREQUENCY SIGNALING SYSTEM

Filed Oct. 29, 1948 7 Sheets-Sheet 2

INVENTORS: W. W. FRITSCHI
C. W. LUCEK
BY
P. C. Smith
ATTORNEY

Dec. 4, 1951 W. W. FRITSCHI ET AL 2,577,614

VOICE-FREQUENCY SIGNALING SYSTEM

Filed Oct. 29, 1948 7 Sheets-Sheet 3

INVENTORS: W. W. FRITSCHI
C. W. LUCEK
BY
P. C. Smith
ATTORNEY

Dec. 4, 1951 W. W. FRITSCHI ET AL 2,577,614

VOICE-FREQUENCY SIGNALING SYSTEM

Filed Oct. 29, 1948 7 Sheets-Sheet 4

INVENTORS: W. W. FRITSCHI
C. W. LUCEK

BY P. C. Smith

ATTORNEY

Dec. 4, 1951 W. W. FRITSCHI ET AL 2,577,614

VOICE-FREQUENCY SIGNALING SYSTEM

Filed Oct. 29, 1948 7 Sheets-Sheet 5

INVENTORS: W. W. FRITSCHI
C. W. LUCEK

BY P. C. Smith

ATTORNEY

Dec. 4, 1951 W. W. FRITSCHI ET AL 2,577,614

VOICE-FREQUENCY SIGNALING SYSTEM

Filed Oct. 29, 1948 7 Sheets-Sheet 6

INVENTORS: W. W. FRITSCHI
C. W. LUCEK

BY P. C. Smith

ATTORNEY

Dec. 4, 1951 W. W. FRITSCHI ET AL 2,577,614

VOICE-FREQUENCY SIGNALING SYSTEM

Filed Oct. 29, 1948 7 Sheets-Sheet 7

INVENTORS: W. W. FRITSCHI
C. W. LUCEK
BY P. C. Smith
ATTORNEY

Patented Dec. 4, 1951 2,577,614

UNITED STATES PATENT OFFICE 2,577,614

VOICE-FREQUENCY SIGNALING SYSTEM

Walter W. Fritschi, Manhasset, and Charles W. Lucek, Port Chester, N. Y., assignors to Bell Telephone Laboratories, Incorporated, New York, N. Y., a corporation of New York Application October 29, 1948, Serial No. 57,384

6 Claims. (Cl. 179—16)

This invention relates to signaling systems and particularly to telephone systems wherein voice frequency currents are employed in the transmission of selective and supervisory signals.

Objects of the invention are the provision of a more reliable and more stable signal transmitting and receiving means in systems employing voice frequency signaling, the provision of such signaling means for the transmission of signals over both two-wire and four-wire lines, the prevention of false operation in response to voice currents or other interfering currents, and the provision of means to insure tone signals of minimum and maximum duration to insure proper signaling.

The invention comprises a voice frequency signaling system in which sigials are transmitted by the initiation and by the termination of transmission of alternating current and by impulses of alternating current, and in which the operation of signal responsive devices is delayed to prevent false operation due to voice currents or other interfering currents and in which signals otherwise of insufficient duration to effect the operation of said devices are lengthened to insure such operation.

One feature of the invention is the provision of an electronic signal receiving circuit responsive to voice frequency signals for controlling signaling devices, said circuit provided with delay means to prevent response thereby to short duration of signal frequency in voice currents in the event that such signals are of sufficient duration otherwise to effect response thereto by said circuit.

Another feature of the present invention is the provision of a voice frequency transmitting circuit arranged, in response to externally created signaling conditions, to transmit voice frequency signals of various degrees of duration to which electronic receiving circuits are intended to be responsive, and means for augmenting excessively short durations of signaling conditions by forcing said transmitting circuit to transmit minimum durations of voice frequency signals irrespective of the durations of said signaling conditions controlling said transmitting circuits to insure response thereto by said receiving circuits.

Further features of the invention are provisions of means whereby the signaling circuits may control the sensitivity and frequency selectivity of the associated receiving circuits, and means whereby the signaling circuits may control the insertion and removal of blocking or band elimination filters into or out of the inward and outward transmission channels associated therewith, all aiding in improving the reliability of proper operation of the signaling circuits under widely differing signaling conditions and aiding in preventing the operation of said circuits by signal frequency in voice currents and aiding in minimizing the effect upon said circuits of audible tones not comprising signaling frequency.

Complete understanding of the invention will be realized from the subsequent description of a typical telephone system embodying the invention. Such a system is disclosed by example in the drawings forming a part of this specification and describable generally as follows:

Figs. 1, 2 and 3 show a first toll office wherein; Fig. 1 shows an operator's position OP1, part of an outgoing trunk circuit OT1, a two-way trunk circuit TWT1, a selector TS1, and an incoming trunk circuit IT1; Fig. 2 shows part of the outgoing trunk circuit OT1, a voice frequency signal generator 200, part of the incoming transmission channel from the toll line, and various control relays associated with the signal transmitting and receiving circuits; Fig. 3 shows the electronic signal receiving circuit and part of the incoming transmission channel from the toll line;

Figs. 4, 5 and 6 show a second toll office wherein Fig. 6 shows an operator's position OP2, part of an outgoing trunk circuit OT2, a two-way trunk circuit TWT2, a selector TS2, and an incoming trunk circuit IT2; Fig. 4 shows part of the outgoing trunk circuit OT2, a voice frequency signal generator 400, part of the incoming transmission channel from the toll line, and various control relays associated with the signal transmitting and receiving circuits; Fig. 5 shows the electronic receiving circuit and part of the incoming transmission channel from the toll line;

Fig. 7 illustrates how Figs. 1 to 6 and 4A or 4B may be arranged to form an operative system.

GENERAL SYSTEM DESCRIPTION

Figure 2:
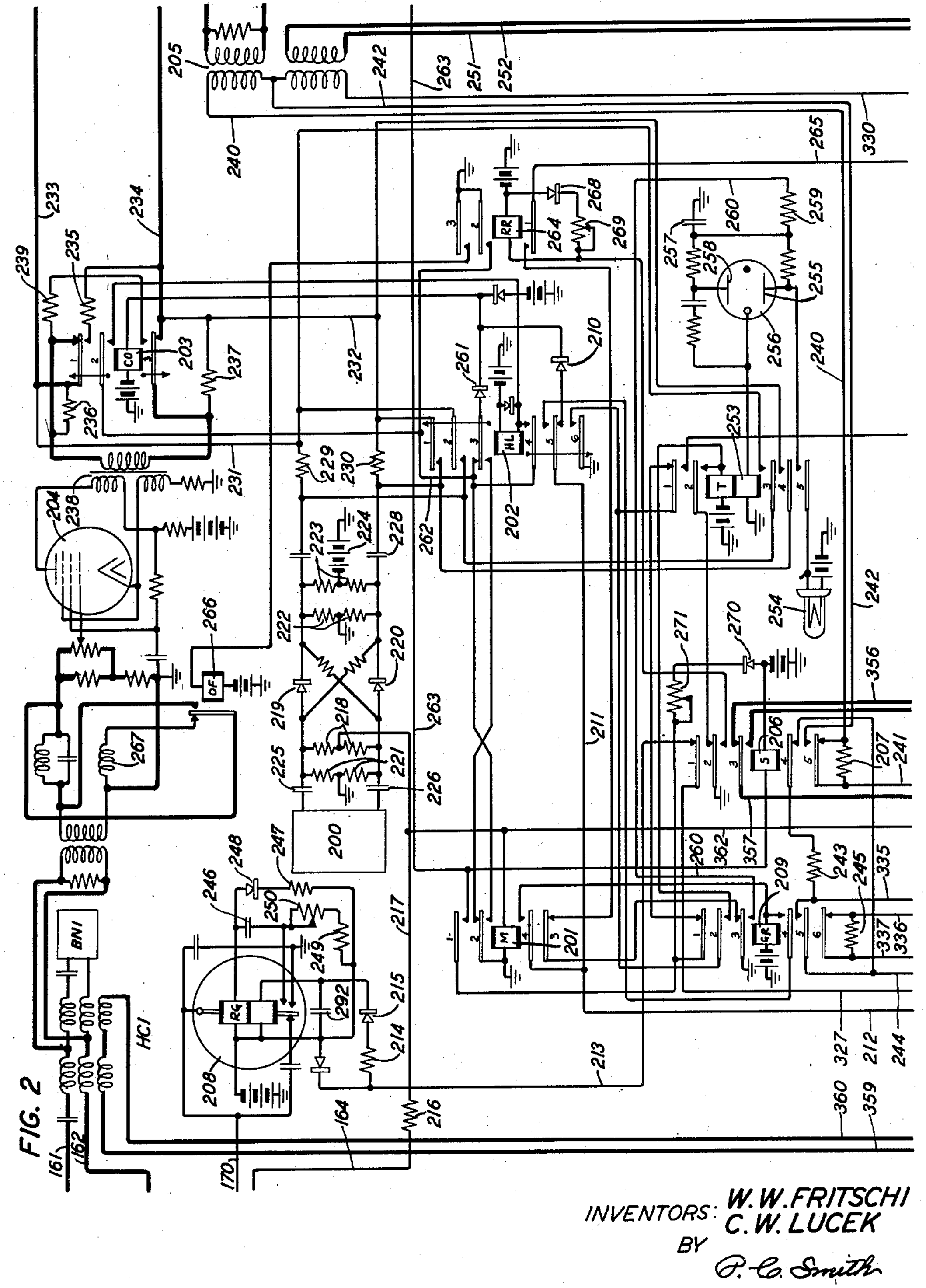

The system represented in the drawings includes a plurality of toll offices each of which comprises a toll board with operators' positions and cords for answering calls incoming from manual or dial local offices, from toll subscribers' lines, from community dial offices, or from other toll offices; and for connecting intertoll trunks with switching trunks leading to called manual or automatic offices, to called toll subscribers' lines, to trunks to community dial offices, and to intertoll trunks to other toll offices. Outgoing jacks are connected to switching trunks, toll subscribers' lines, trunks to community dial offices and intertoll trunks. Answering jacks are connected to recording trunks, toll subscribers' lines, trunks from community dial offices and intertoll trunks. Intertoll first selectors, and intertoll second selectors, if required, are provided for use on calls incoming over intertoll trunks to establish connections with other toll, local or community dial offices. The operators' positions are provided with dials for use in controlling the operation of intertoll selectors in other toll offices and for controlling the operation of selector and connector switches in local or community dial offices.

Reference may be made to Patents 2,209,777 to R. E. King and O. R. Miller of July 30, 1940, and 2,306,236 to J. E. Walsh of December 22, 1942, for a complete disclosure of the cord and operator's position circuits provided in each of the two toll offices for interconnecting calling and called lines and trunks and for controlling the completion of toll calls. The outgoing trunk circuits OT1 and OT2, incoming trunk circuits IT1 and IT2, two-way trunk circuits TWT1 and TWT2, and the toll route selector circuits TS1 and TS2 are all similar to corresponding circuits of the aforementioned King-Miller and Walsh patents.

Figure 4:
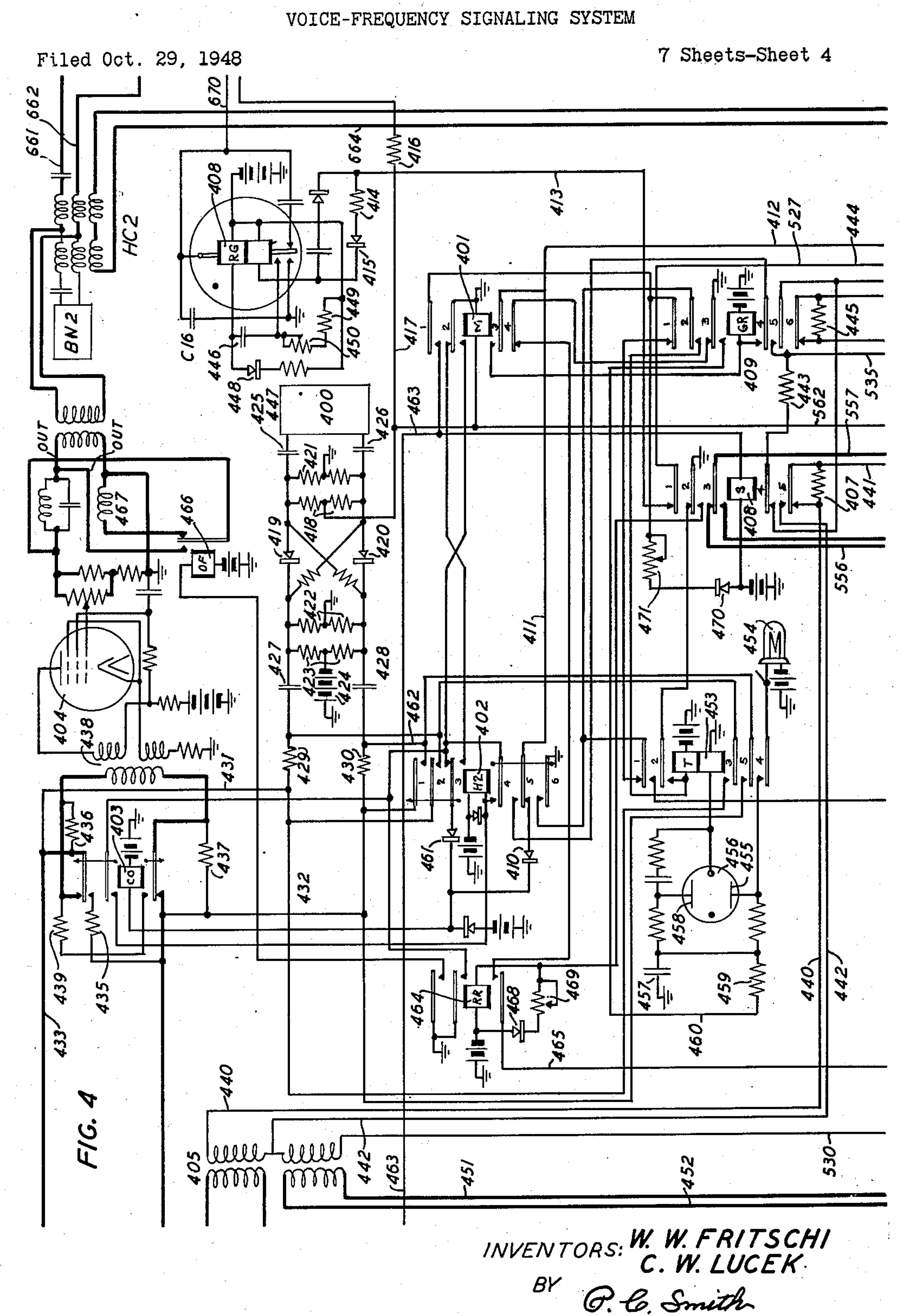
Fig. 4A shows a typical four-wire toll line arrangement.
Fig. 4B shows a typical two-wire toll line arrangement.
Figure 4A:
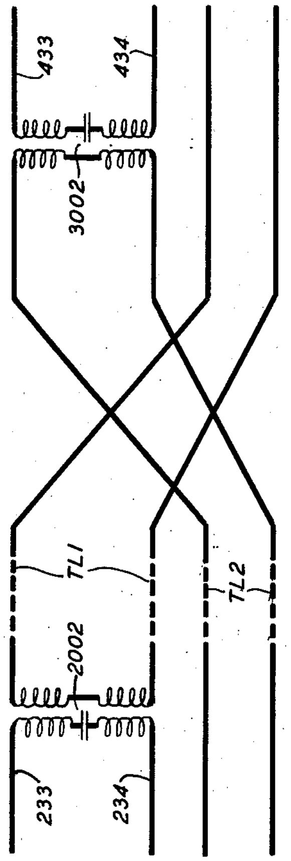
Figure 4B:
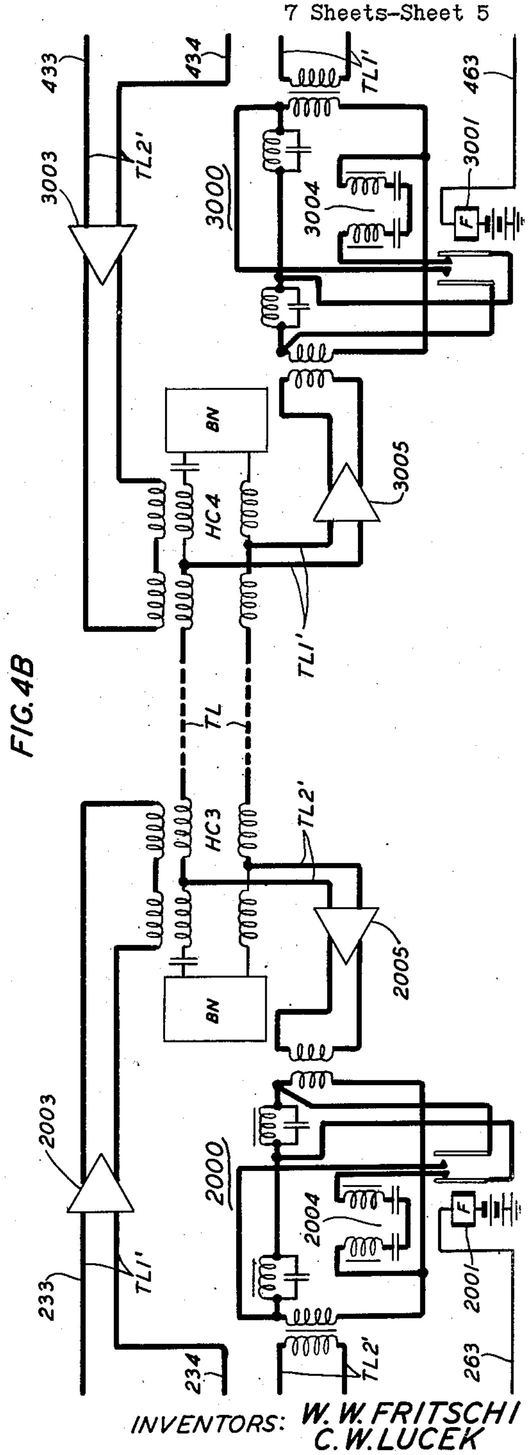

The two toll offices shown in the drawings are interconnected by either four-wire lines or two-wire lines, or a combination of both. One two-wire line is shown in Fig. 4B and comprises the two-wire toll line TL associated with trunk circuits OT1 and TWT1 in the first toll office and with trunk circuits OT2 and TWT2 in the second toll office. One four-wire line is also shown in Fig. 4A and comprises two two-wire lines TL1 and TL2 associated with the above-mentioned trunk circuits OT1, OT2, TWT1 and TWT2. The illustrations of Figs. 4A and 4B are to be understood as indicating that four-wire and two-wire line operation is alternative. In the former case, line TL1 serves to transmit voice and voice frequency signaling current from the first toll office to the second and the line TL2 serves to transmit voice and voice frequency signaling current from the second toll office to the first. In case of two-wire line operation the line TL serves to transmit voice and voice frequency signaling in both directions, the signaling in both directions being performed at different frequencies which are selected and blocked as hereinafter described in order that the two-wire line TL be capable of operating into the first and second toll offices arranged as four-wire terminations for the two-wire intertoll line TL without undesired infiltration of the wrong signaling frequency into the wrong circuits at the wrong time. A hybrid coil HC1 individual to trunk circuits OT1 and TWT1 is arranged to transmit voice current from these trunk circuits over toll line TL1 or TL to the second toll office and to receive and transmit voice current incoming over toll line TL2 or TL to these trunk circuits. A like hybrid coil HC2 individual to trunk circuits OT2 and TWT2 is arranged to transmit voice current from these trunk circuits over toll line TL2 or TL to the first toll office and to receive and transmit voice current incoming over toll line TL1 or TL to these trunk circuits. Balancing networks BN1 and BN2 are connected to hybrid coils HC1 and HC2 in the usual and well-known manner.

GENERAL DESCRIPTION OF SIGNAL TRANSMITTERS

The signal transmitter at the first toll office comprises a generator 200 of alternating current of a particular voice frequency, for instance, 1600 cycles per second, a relay 201 responsive to seizure, selective, supervisory and disconnect signals which are to be transmitted over the toll line TL1 or TL, a signal tone level control relay 202 and a cut-off relay 203 for effectively disconnecting and terminating the toll line TL1 in Fig. 4A or the equivalent one-way amplifier channel TL1' of Fig. 4B associated with toll line TL, to effectively prevent noise originating in the local trunk circuit from being transmitted over the toll line TL1 or over toll line TL from channel TL1' during the transmission of signals outgoing over the toll line. As will be explained, a low level 1600-cycle per second continuous tone signal is transmitted over the toll line TL1 or TL from the first toll office to the second toll office to indicate that the first office is receptive to accept calls. One-way amplifier comprising vacuum tube 204 and connecting hybrid coil HC1 to the toll line TL1, and one-way amplifier comprising vacuum tube 300 and connecting toll line TL2 or channel TL2' to hybrid coil HC1 prevent the transmission of signaling current from the signal transmitter at the first toll office over toll line TL2 or channel TL2'. Amplifier 300 is effective further to prevent noise developed in the local circuits from affecting the receiver by transhybrid currents over hybrid coil HC1. Furthermore, in the case of a two-wire toll line TL, a filter circuit 2000 is inserted into channel TL2' for blocking the transmission of signaling frequency current of 1600 cycles per second from channel TL1' to channel TL2' through hybrid coil HC3.

The signal transmitter at the second toll office is similar to the one outlined briefly above in connection with the first toll office, corresponding elements having reference characters with the same tens and units digits. Thus, signaling current from generator 400 is normally transmitted at a low level over toll line TL2 or channel TL2' and toll line TL. The signaling frequency generated by generator 400 may be 1600 cycles per second, the same as generated by generator 200, in the case of a four-wire line such as TL1, TL2. However, in the event of a two-wire line, such as TL of Fig. 4B, the signaling frequency generated by generator 400 must be different, say 2000 cycles per second, as will be apparent from subsequent description. In the latter case, filter circuit 2000 will pass 2000 cycles per second but not 1600 cycles per second, unless relay 2001 operates to eliminate the band elimination characteristics of filter 2000 as will be discussed. Likewise, filter circuit 3000 will pass 1600 cycles per second but not 2000 cycles per second, likewise under the control of a relay 3001. Furthermore, one-way amplifier comprising vacuum tube 404 connecting hybrid coil HC2 to the toll line TL2, and one-way amplifier comprising vacuum tube 500 connecting toll line TL1 or channel TL1' to hybrid coil HC2 prevent the transmission of signaling current from the signal transmitter at the second toll office over toll line TL1 or channel TL1'. Amplifier 500, as was the case with amplifier 300, specifically excludes noise generated in the local circuits from affecting the receiver. In addition, as above indicated, in the case of a two-wire toll line TL, a filter circuit 3000 is inserted into channel TL1' for blocking the transmission of signaling frequency current of 2000 cycles per second from channel TL2' to channel TL1' through hybrid coil HC4.

GENERAL DESCRIPTION OF SIGNAL RECEIVERS

Figure 3:
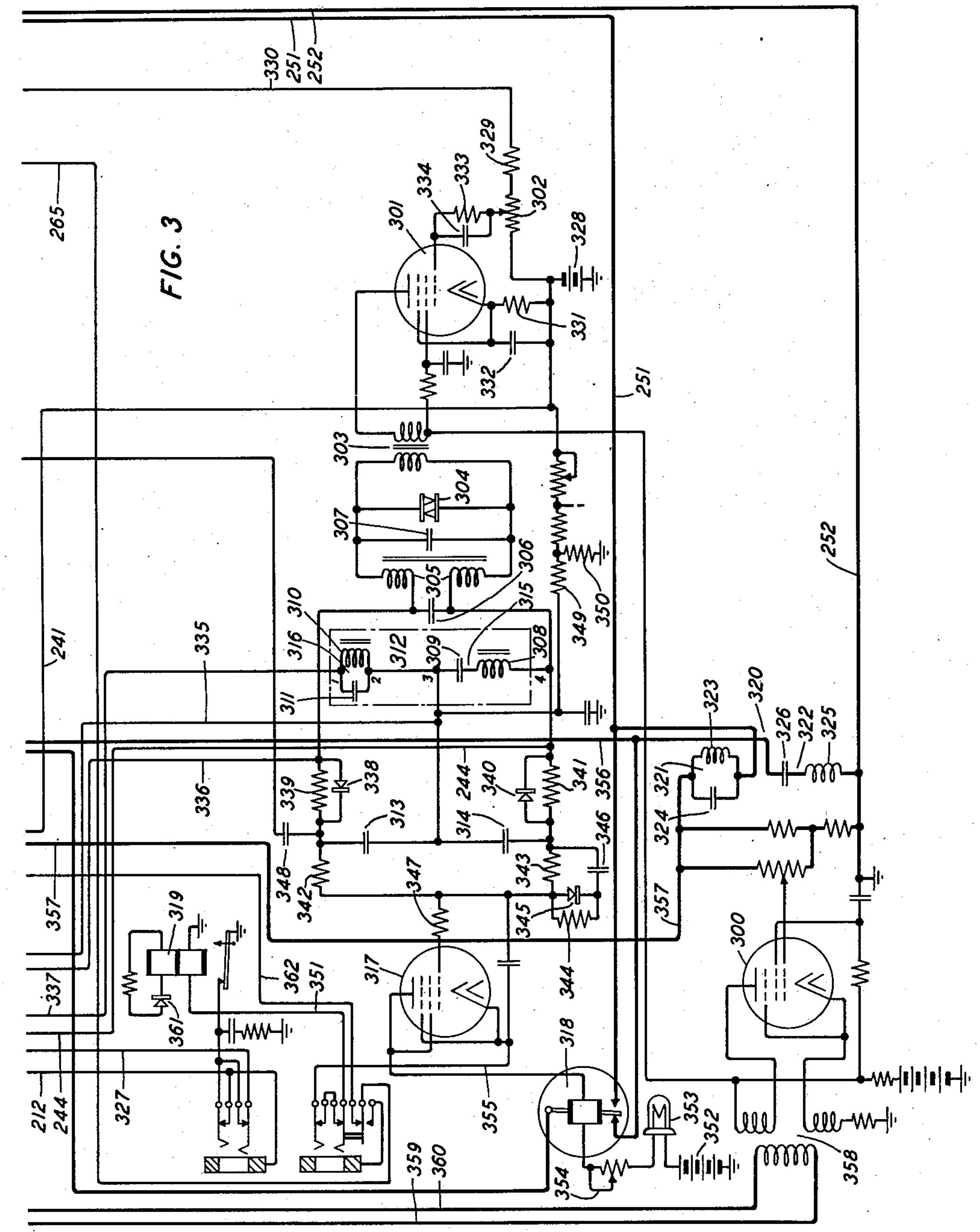

The signal receiver at the first toll office, shown mainly in Fig. 3, includes a vacuum tube amplifier represented by vacuum tube 301 whose input circuit includes one or both of the left-hand windings of transformer 205 which terminates either toll line TL2 of Fig. 4A or channel TL2' of Fig. 4B. Sensitivity relay 206, when released, includes both of the left-hand windings of transformer 205 in the grid-cathode input circuit of tube 301; and, when operated, includes only the lower left-hand winding of transformer 205 in said input circuit, the upper left-hand winding being unused and terminated by resistance 207 over the No. 5 armature and front contact of the sensitivity relay 206. The condition of operation of relay 206 and the adjustment of potentiometer 302 determine the amount of input signal frequency to amplifier 301 or the sensitivity of the receiver. The output from amplifier 301 is transmitted through a transformer 303 to a load comprising a volume limiting varistor arrangement 304, a low-pass filter comprising a retard coil 305 and condensers 306 and 307, and a frequency discriminating network 312 including a resonant section 315 of inductance 308 and condenser 309 and an anti-resonant section 316 of inductance 310 and condenser 311, each section tuned or resonant to the signal frequency incoming over toll line TL2 or channel TL2'. Each of the sections 315 and 316 of network 312 is shunted by a rectifying arrangement including respectively condensers 314 and 313 which accumulate charges corresponding respectively to the voltages appearing across the sections 315 and 316. These latter voltages are respectively representative of the amounts of signal frequency and other frequencies presented to them from the output of tube 301. The charges on condensers 313 and 314 are effective in controlling the grid voltage of tube 317 such that if signal frequency predominates, or exists alone in sufficient amount, the grid voltage of tube 317 is sufficiently positive with respect to the cathode such that the plate current permitted to flow will operate the remove-filter relay 318 and the receiver relay 319. On the other hand, if other frequencies than the signal frequency predominate, or exist alone, the grid voltage of tube 317 is insufficiently positive to permit the operation of relays 318 and 319. Both of the relays 318 and 319 are shown in their operated conditions as a result of low level signal frequency input to amplifier 301 representing a signal from the second toll office that it is in an idle condition with respect to toll line TL2 or channel TL2' and toll line TL. The operation of relay 319 completes the operating circuit for regeneration relay 208 which in turn removes ground from lead 170 at its armature in circuit to incoming trunk circuit IT1 of the first toll office. Furthermore, relay 319, in operating, operates the cut-off relay 203 to terminate the repeat coil in the outward transmission channel to toll line TL1 or channel TL1' to toll line TL as hereinbefore outlined.

When, therefore, low level signal frequency is present in the incoming transmission channel from toll line TL2 or toll line TL over channel TL2' indicating that such channel is idle with respect to the second toll office, the relays 318 and 319 of the signal receiver at the first toll office are operated, as well as relays 208 and 203 controlled in part thereby.

In addition to the above outlined signal receiver comprising vacuum tubes 301 and 317 and relays 318 and 319, the inward transmission channel is provided with the previously mentioned amplifier tube 300 and associated circuit. The input signal for said tube 300 is derived from the lower right-hand winding of transformer 205 and is confronted by a blocking network 320 consisting of two sections 321 and 322 switchable into and out of the input circuit under the control of the remove-filter relay 318 and the aforementioned sensitivity relay 206. Section 321 of filter network 320 includes inductance 323 and condenser 324 in an anti-resonant circuit. Section 322 of filter network 320 includes inductance 325 and condenser 326 in a resonant circuit. Both sections are resonant at the incoming signal frequency and, therefore, in effect amount to a band elimination filter most efficient at the incoming signal frequency. The prime purpose of network 320 is, as will be apparent, to exclude signaling frequency signals from the hybrid coil HC1 at the proper instants to exclude such signals from the local trunk circuits of the first toll office or from successive sections of a built up switched connection and from the outgoing transmission channel.

In Fig. 4B, when a two-wire toll facility is used, an additional blocking circuit is provided under the control of the filter relay 2001 for preventing the signal frequency of the first toll office from being transmitted to the incoming transmission channel through hybrid coil HC3.

In connection with the discrimination network 312 in the input circuit for tube 317 the discharge circuits for condensers 313 and 314 are arranged to provide a sluggishness in the operation of tube 317 for the purpose mainly of preventing receiver operation in response to very short spurts of pure signal frequency which may be incorporated in voice currents. These discharge circuits, by means of proper proportions of resistances 342 and 343, as will be explained later, also proportion the amounts of pure signal frequency and other frequencies affecting the tube 317.

Also, additional means for preventing longer spurts of pure signal tone from affecting the signal lead 170 to the local trunk circuits is provided in the form of a mechanical delay in the cooperative operations and releases of relays 319, 206, 208 and 209. Such mechanical or electromagnetic relay delay does not prevent the operation of the remove-filter relay 318 to cut the blocking network 320 into the inward transmission channel on the receipt of longer spurts of signal tone in the voice currents but does prevent false signaling of the local trunk circuits.

Since the above delays, particularly the slow operation of relay 319 and the actual receiver delays, which may be considered electronic delays in that they effect foreshortening of any pulses or spurts of signal tone incoming over the incoming transmission channel, will, of course, foreshorten actual signal pulses as well as spurts of pure signal tone in the voice currents. To compensate for actual full-sized signal pulses which are foreshortened and for actual pulses of signal frequency current which might be of too short a duration to operate regeneration relay 208 for a long enough period of time to properly signal the local trunk over signal lead 170, relay 208 is provided with winding circuit arrangements whereby irrespective of the aforesaid foreshortening of signal pulses relay 208 will transmit to the local trunk circuit a normal duration of direct current signal over lead 170. Furthermore, incoming pulses of signal tone which may be of greater duration than required for a proper signal to the local trunk circuit will, by reason of the aforementioned electronic delays, be shortened.

Figure 5:
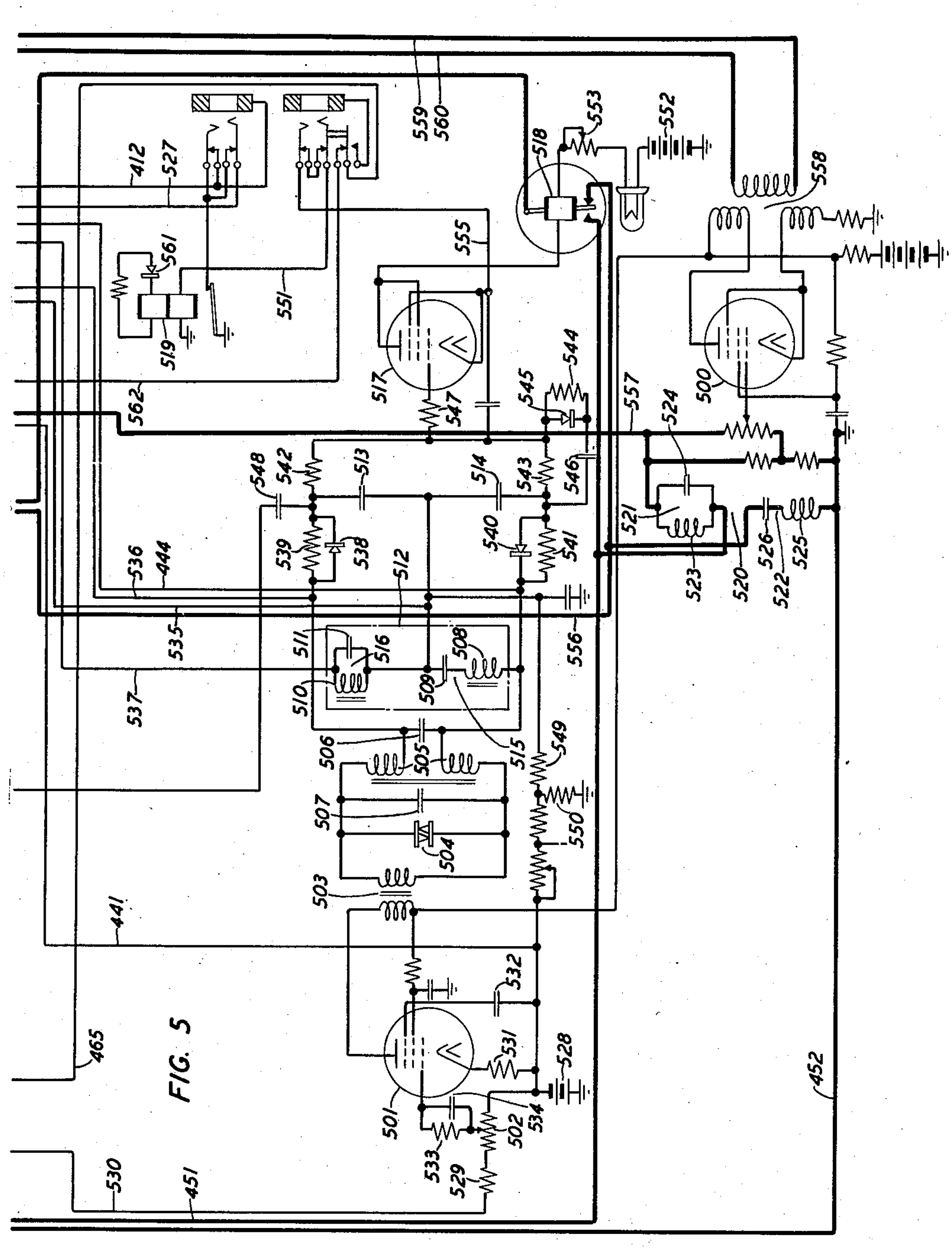
Figure 6:
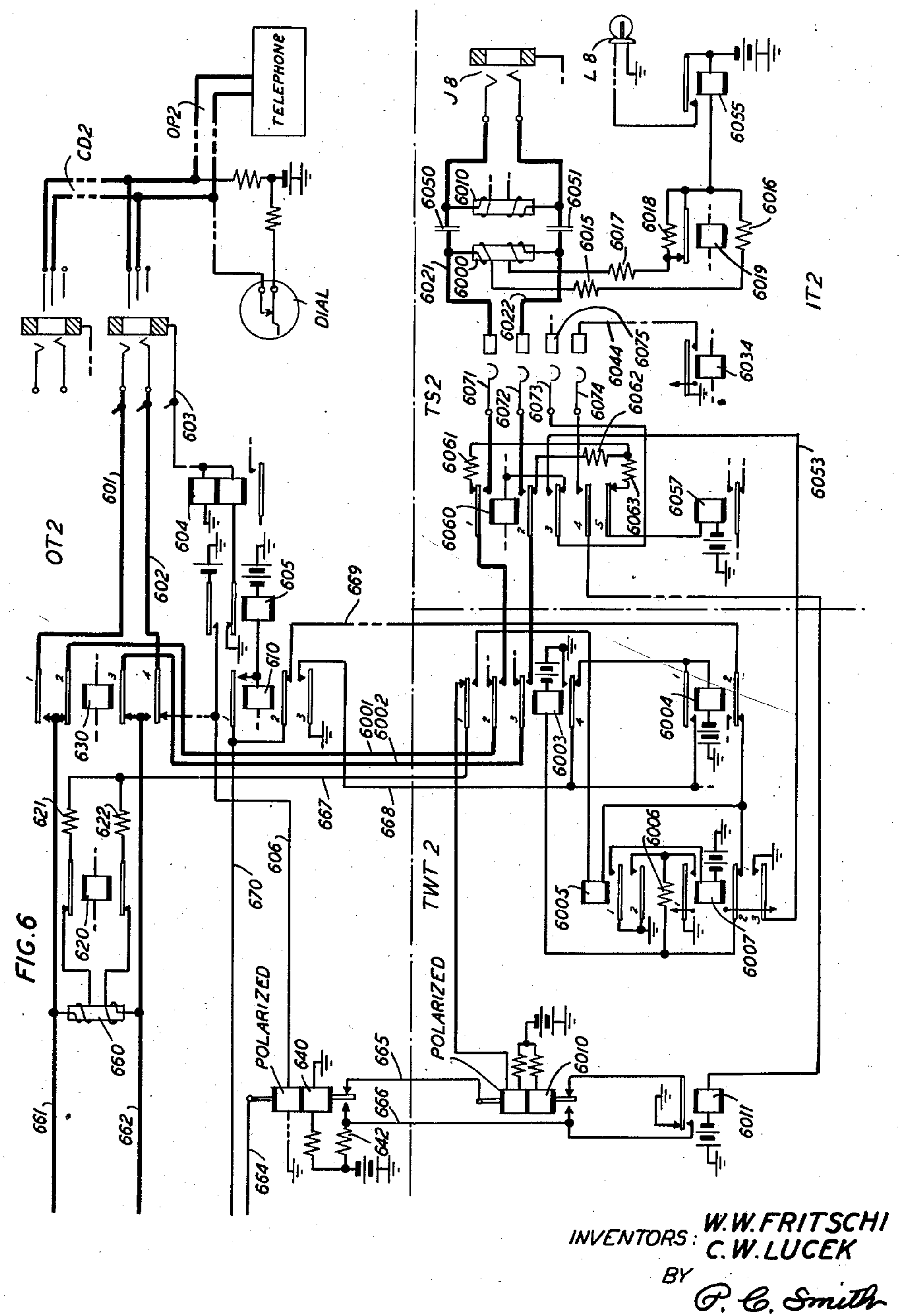

The signal receiver of the second toll office is shown mainly in Fig. 5 and is the same as the signal receiver previously outlined in connection with the first toll office. The signal receiver at the second toll office is provided with reference numerals having the same tens and units digits as corresponding elements of its counterpart in the first toll office.

DETAILED DESCRIPTION

It is believed that a full understanding of the present invention will be realized most easily from a description of the detailed operation of the disclosed system under various conditions encounterable during a typical toll call. The following description is provided with that purpose in view.

*Idle condition of all circuits*

All circuits and relays therein are shown in their idle conditions, i. e., when all circuits are available to initiate or receive calls, except for cut-off relay 203 which under idle conditions is operated in a circuit from ground and battery, through the winding of relay 203, varistor 210 in the low resistance direction, over the No. 5 armature and back contact of relay 202, over conductors 211 and 212, over the upper normal contacts of the R test jack to ground over the front contacts of the operated receiver relay 319, the operation of which relay 319 will be explained hereinafter and has been outlined previously.

Polar relay 140 of outgoing trunk circuit OT1 and polar relay 1010 of two-way trunk circuit TWT1, being energized only by means of their lower windings in obvious circuits, are conditioned as shown such that their armatures are in their left-hand positions.

Regeneration relay 208 is operated as shown when the circuits are idle. The operating path may be traced from ground at the front contacts of the operated receiver relay 319, over the lower normal contacts of the R test jack, over conductor 327 over the No. 1 armature and back contact of sensitivity relay 206, over conductor 213, through resistance 214, varistor 215 in the low resistance direction and to battery and ground through the lower winding of relay 208. Relay 208, in operating, disconnects the signal lead 170 to the local trunk circuits from ground on its lower right contact. The lack of ground on lead 170 is a signal to the local trunk circuits that there is no call incoming thereto over toll line TL2 or toll line TL via channel TL2'.

The remove-filter relay 318 is operated such that its armature is in its left-hand position as shown. The circuits for relays 318 and 319 are, as heretofore outlined and as will be explained further hereinafter, included in the plate-cathode circuit of tube 317.

The signal generator 200, under idle condition of the associated trunk circuit, is arranged to transmit over toll line TL1 through repeat coil 2002 a low level of signal frequency of say 1600 cycles per second. Signal lead 164 from the local trunk circuit is grounded at the back contacts of relay 1011. This circuit may be traced from ground at the back contacts of relay 1011, left-hand contact and armature of relay 1010, left-hand contact and armature of relay 140, signal lead 164, through resistance 216, conductor 217 to the mid-point of resistance 218. The left-hand terminals of each of the varistors 219 and 220, therefore, have a resistance path to ground at the mid-point of resistance 221 and to ground at the conductor 217 connected to the mid-point of resistance 218. On the right-hand side of varistors 219 and 220 a negative potential to ground exists by virtue of the potentiometer arrangement comprising resistances 222 and 223 and battery 224. A small current is permitted to flow through varistors 219 and 220 in the forward, or left to right, direction which is the low resistance direction, thereby causing the resistance of the varistors to become relatively small. The output of signal frequency, of say 1600 cycles per second, is transmitted through condensers 225 and 226, varistors 219 and 220, condensers 227 and 228 and resistances 229 and 230 to respective conductors 231 and 232 and over tip conductor 233 and ring conductor 234, and through repeat coil 2002 to toll line TL1 to the second toll office. Due to the presence in the latter circuit of series resistances 229 and 230 the level of the signal frequency transmitted over the toll facility TL is relatively low.

In the case of a two-wire toll facility, as in Fig. 4B, the low level signal tone is transmitted over channel TL1', through one-way amplifier 2003 and through hybrid coil HC3 and over toll line TL to the second toll office.

As previously mentioned, filter circuit 2000 comprises a band elimination filter or blocking network at the frequency of the signal tone transmitted from signal generator 200 in the first toll office. As will be obvious, operation of the filter relay 2001 will remove the resonant section 2004 from its bridging connection across the inward transmission channel and will short circuit the two series parallel resonant sections to eliminate the filtering action of filter 2000.

In either case of two-wire or four-wire toll line operation the operated cut-off relay 203 effectively cuts off the transmission channel comprising tip conductor 233 and ring conductor 234 from the local trunk circuit by bridging a terminating resistance 235 thereacross over the upper No. 1 front contacts of relay 203 and by inserting resistances 236 and 237 in series with the tip and ring conductors 233 and 234 from the secondary winding of transformer 238 and by inserting a bridging or terminating resistance 239 across the secondary winding of transformer 238. Upon the release of cut-off relay 203, as will be obvious, each of the aforementioned series or bridging or terminating resistances is either short-circuited over back contacts of relay 203 or is isolated in an open circuit to thereby leave a direct termination of transformer 238 by the channel comprising conductors 233 and 234 and repeat coil 2002 or by the channel comprising conductors 233 and 234, channel TL1', amplifier 2003 and hybrid coil HC3.

The above described continuous low level signal frequency tone is transmitted from the first toll office to the second toll office to signal the latter that the first toll office is idle and is not in a calling condition and can be called. The idle condition at the second toll office is the same as at the first toll office and, therefore, signal generator 400 will transmit a low level signal tone through varistors 419 and 420, through series resistances 429 and 430, over conductors 431 and 432, over tip conductor 433 and ring conductor 434, and through repeat coil 3002 to toll line TL2 to the first toll office in the case of a four-wire toll facility, or over channel TL2', through amplifier 3003, and through hybrid coil HC4 and over toll line TL to the first toll office in the case of a two-wire toll line.

The low level signal tone incoming to the first toll office over toll line TL2 is transmitted through transformer 205 to the input of the signal receiver of the first toll office represented by the input circuit of tube 301 and to the input circuit of the one-way amplifier represented by tube 300 in the incoming transmission channel to hybrid coil HC1 and therefrom to the local trunk circuit. As will be understood, little of the signal tone is transmitted to coil HC1 due to the blocking action of the filter 320. As previously outlined the sensitivity or level of the input stage of the signal receiver is controlled by the condition of the sensitivity relay 206 and by the position of potentiometer 302. When relay 206 is released the grid circuit of tube 301 is energized by the entire secondary winding of transformer 205 in a circuit extending from the negative terminal of battery 328 through potentiometer 302 and resistance 329, over lead 330 through the whole secondary winding of transformer 205, over lead 240, over the No. 5 armature and back contact of relay 206, and over lead 241 back to the negative terminal of battery 328. When sensitivity relay 206 is operated the same grid circuit of tube 301 is energized by only the bottom half of the secondary winding of transformer 205 in a circuit extending from the negative terminal of battery 328, through potentiometer 302 and resistance 329, over lead 330, through the lower half of the secondary winding of transformer 205, over lead 242, over the operated No. 5 armature and front contact of relay 206 and over lead 241 back to the negative terminal of battery 328. The upper half of the secondary winding of transformer 205 is shunted by resistance 207 when relay 206 is operated in order to provide a load termination for the unused voltages appearing thereacross.

Tube 301 is self-biased by resistor 331 shunted by condenser 332 and is provided with a grid resistor 333 shunted by a condenser 334 to limit grid current on high level voice and signaling currents. The incoming signal may be substantially zero or almost pure signal frequency or almost purely other frequencies than the signal frequency transmitted from the second toll office or a combination of both signal and other frequencies. This input signal is amplified by tube 301 and transmitted through transformer 303 to a load comprising volume limiting varistors 304, a low-pass filter composed of retard coil 305 and condensers 306 and 307, and the discriminating network 312 with associated circuit elements. The varistor arrangement 304, as indicated, is arranged to provide a low resistance shunt in both directions for signal voltages of a certain amplitude to thereby limit the peak-to-peak voltage of the signals transmitted to the low-pass filter and to the discriminating network 312. These signals, of course, will be composed of high-frequency components and harmonics due to the limiting action of varistors 304 and to the limiting action of grid current and to cut-off conditions of tube 301. The low-pass filter is useful in filtering out sufficient of these high harmonics such that when high level pure signal tone is received the discriminating network 312 will not be unduly influenced thereby as will be appreciated from subsequent description.

*Detailed description of receiver*

It is considered advisable at this point to describe in detail the action of the receiver and its novel characteristics under certain input conditions so that a full understanding will have been acquired as to its functioning when the description of the idle and other conditions of the receiving circuits is continued hereinafter.

The discriminating network 312 contains two sections. One anti-resonant or parallel resonant section 316 between terminals 1 and 2 is composed of inductance 310 and capacitance 311 and is arranged to be resonant in parallel at the frequency of signal current transmitted from signal generator 400 at the second toll office. The other resonant or series resonant section 315 between terminals 3 and 4 is composed of inductance 308 and condenser 309 and is arranged to be resonant in series at the frequency of signal current transmitted from the second toll office. As will be remembered, such signal frequency may be the same, say 1600 cycles per second, as that transmitted from signal generator 200 at the first toll office in case a four-wire toll line is used as shown in Fig. 4A, but must be different, say 2000 cycles per second, in case a two-wire toll facility is used as shown in Fig. 4B. Section 315 is normally shunted by resistance 243 in a circuit extending from terminal 3 of section 315, over conductor 335, through resistance 243, over the No. 4 armature and back contact of sensitivity relay 206 and over conductor 244 to terminal 4 of section 315. The section 316 will present a high impedance to pure signal frequency and a relatively low impedance to other frequencies. The section 315 will, on the other hand, present a low impedance to pure signal frequency and a relatively high impedance to other frequencies. Resistance 243, when in parallel with section 315 whenever the sensitivity relay 206 is released, limits the impedance of section 315 to substantially a maximum of the value of resistance 243; but, when the sensitivity relay 206 is operated, to thereby remove resistance 243 from its shunting relationship with section 315, section 315 may reach values of impedance at frequencies differing more and more from pure signal frequency that are many times the value of resistance 243. The removal of resistance 243 from its shunt path across section 315, therefore, permits a greater amount of voltage to develop across section 315 due to the presence of frequencies other than pure signal frequency. For convenience of terminology, the section 315 may be referred to as the "guard" channel and the section 316, as the "signal" channel and the reasons for such terminology will be apparent from subsequent description. Briefly, "signal" channel relates to section 316 because it will produce its greatest voltage at the pure signal frequency of 1600 or 2000 cycles per second and "guard" channel relates to section 315 because it will produce its greatest voltage at frequencies other than pure signal frequency, the latter statement depending, of course, on the shunting action of resistance 243 under control of the sensitivity relay 206.

The effect of discriminating network 312 is further under the control of the guard removal relay 209. The actual transmission path from the top plate of condenser 306 of the low-pass filter extending to terminal 4 of section 316 is traced over conductor 336, over the unoperated No. 6 armature and back contact of relay 209, and over conductor 337 to terminal 1 of section 316. When guard removal relay 209 is operated the latter circuit is made to include resistance 245 since the No. 6 armature and back contact of relay 209 are no longer short-circuiting resistance 245. Furthermore, relay 209 in operating, short-circuits section 315 by connecting conductor 335 to conductor 244 over the No. 5 armature and front contact of relay 209. The including of resistance 245 in series with section 316 and the short-circuiting of section 315 changes the characteristics of the discriminating network 312 to make it non-selective to incoming frequencies.

Each section 316 and 315 of the discriminating network 312 is shunted by a half-wave rectifying arrangement. Section 316 is shunted by the rectifying arrangement comprising varistor 338 in parallel with resistance 339 and in series with condenser 313. Section 315 is shunted by a similar arrangement of varistor 340 in parallel with resistance 341 and in series with condenser 314. The resistances 339 and 341 are used in an effort to equalize the respective resistances of varistors 338 and 340 in the reverse or high resistance direction. It will be apparent that an alternating current voltage will appear across each section 315 and 316 of the discriminating network 312 and, as a result of the rectifying action of the above described rectifying arrangements shunting sections 315 and 316, a direct current voltage will appear across condenser 313 and another direct current voltage will appear across condenser 314, the respective direct current voltages representing signal channel voltage and guard channel voltage. If the received signal contains only the frequency of the signaling tone a relatively large voltage will appear across condenser 313. If, however, the received signal contains only frequencies other than the signal tone frequency a relatively large voltage will appear across condenser 314. If both types of frequencies are present there will be represented by corresponding voltages on both condensers 313 and 314 the relative power and frequencies of the various components in the composite signal.

The varistors 338 and 340, when poled as shown and when understood to pass current at a low resistance in the forward direction (direction of arrowhead) when under the influence of a voltage pressure attempting to force current in that direction, will effect a positive charge on the top plate of condenser 313 and a negative charge on the bottom plate of condenser 314. The voltages on condensers 313 and 314 have a combined effect, by means of resistance 342 and resistance 343, with its shunting circuit of resistance 344, varistor 345 and condenser 346, on the grid input voltage of tube 317. Condenser 348 connected to the upper plate of condenser 313 has an effect upon the combined control of the grid voltage of tube 317 as will be explained later.

The grid cathode bias on tube 317 is derived from the algebraic sum of the voltages in the path extending from the grid of tube 317, through resistances 347 and 342, through condenser 313, through resistance 349, through resistance 350 comprising part of a potentiometer network from ground to negative battery 328, to ground, thence through the lower winding of the receiver relay 319, over conductor 351, and over the upper two sets of normal contacts of the D. C. test jack to the cathode of tube 317. If the input to the receiver is pure signal tone frequency, a voltage will be developed across condenser 313, resulting in a discharge current from the top positive plate of condenser 313, through resistance 342, through resistance 343, through varistor 340, over lead 244, over the back contact and No. 4 armature of relay 206, through resistance 243, and over conductor 335 to the negative or lower plate of condenser 313. If a sufficient amount of pure signal frequency is transmitted to the discriminating network 312 the algebraic sum of the voltage on condenser 313 and the voltage drop in resistance 342 will be a positive voltage sufficient to produce a grid-to-cathode voltage at tube 317 sufficient to permit plate current to flow to the extent that the remove-filter relay 318 and the receiver relay 319 will operate. The operating path for relays 318 and 319 extends from positive plate battery 352, through lamp 353, potentiometer 354 for controlling the maximum plate current, through the winding of relay 318, over the plate to cathode discharge path within tube 317, over conductor 355, over the upper pair of normal contacts of the D. C. test jack, over conductor 351, and through the lower winding of relay 319 to ground. If, on the other hand, other frequencies than pure signal tone frequency are present in the composite signal transmitted to the discriminating network 312 there will be voltages on both condensers 313 and 314 which, as will be apparent, produce discharge currents which flow through resistance 342 in the same direction. If the voltage drop in resistance 342 due to this combined discharge current exceeds the voltage on condenser 313 the grid-to-cathode voltage of tube 317 will be reduced below cut-off. It should be apparent at this point in the description that the terms "signal" and "guard" channels are related to the functioning of the receiver in that the "signal" channel alone (section 316) produces a voltage which tends to operate the receiver by operating relays 318 and 319 whereas the "guard" channel (section 315) creates a voltage and in turn a discharge current which tends to "guard" against receiver operation.

The shunt path across resistance 343 in the discharge path of condensers 313 and 314 provides a delay in the build up of sufficient positive voltage on the grid of tube 317 to effect the operation of relays 318 and 319. This delay is helpful in preventing receiver response due to short pulses of pure signal tone which might be present in voice currents. From a condition of no signal to a condition of pure signal tone or other signal containing pure signal tone and other frequencies varistor 345 and condenser 346 present practically no resistance at all to the discharge current and in effect short-circuit resistance 343. The net effect of this transient short circuit is to produce a larger discharge current than without the transient effect for a relatively small voltage on condenser 313. This larger discharge current effects a larger voltage drop in resistance 342 to thereby delay the build up of sufficient positive grid voltage to operate relays 318 and 319.

Upon sharp transitions from no signal tone or other signal to a pure signal tone or a composite signal, even though the low-pass filter prevents a great deal of the high harmonics from affecting the discriminating network 312, a considerable amount of harmonic energy generated in the limiting stage will still filter through and will be effective in producing a voltage on condenser 314. The latter voltage will assist the action or varistor 345 and condenser 346 in delaying the response of tube 317 to prevent receiver response to short pulses of pure tone signal which may appear in voice currents. After the transient period, however, the shunting action of condenser 346 will disappear. There will be little, if any, harmonics in a pure continuous tone signal but harmonics due to the limiting stage will still be present. The value of resistance 343 becomes the minimum determinant of that portion of the discharge path.

Under the foregoing conditions it is apparent that the signal tone voltage pulses appearing at the grid of tube 317 are foreshortened. Another delay is provided by means of the effectively short-circuited upper winding of relay 319 upon operating energization of its lower winding, thereby making relay 319 slow operating which, as will be readily apparent from subsequent description, further delays the operation of the receiver with respect to its effect upon the signaling conductor 170 of the local trunk circuit. These two delays affecting the change of signaling conditions on the signaling conductor 170 may be, as hereinbefore stated, referred to as electronic delay of the receiver. This electronic delay accomplishes two main purposes; namely, one to prevent receiver operation as a result of short pulses of pure tone signal frequency appearing in voice currents or otherwise and two, to foreshorten longer pulses of pure tone signal in voice currents. The slow operation of relay 319 delays a change in the condition of the signaling conductor 170 to the local trunk circuit, beyond the delay caused by the receiver foreshortening of pulses and for some short pulses will prevent such signaling altogether.

This electronic delay will, of course, affect some normal signaling pulses but such pulses are of long enough duration to effect the operation of regeneration relay 208 which controls signal conductor 170 or are not materially affected by the electronic delay due to the lowering of the sensitivity of the receiver or the elimination of the selective feature of the guard channel, or by corresponding lengthening of the pulse by relay 253 and condenser 348.

Nevertheless, since all pulses will be foreshortened, it is necessary to provide for effectively lengthening unduly short signal pulses to their proper duration before passing the signal to the local trunk circuit or to another toll facility. The special circuits and associated circuit elements concerning the regeneration relay 208 provide such lengthening. The relay 208 is operated in a circuit extending from ground over the armature and front contact of relay 319, lower normal contacts of the R test jack, over conductor 327, over the No. 1 armature and back contact of relay 206, over conductor 213, and through resistance 214 and varistor 215 and the lower winding of relay 208 to negative battery. When relay 208 releases, ground is applied to signaling conductor 170 over the right lower contact and armature of relay 208. At the same time condenser 246 is charged in a circuit extending from negative battery, through resistance 247 and varistor 248 and condenser 246 to ground over the two right front contacts and armature of relay 208. When relay 208 is again operated the armature will break from its right hand contacts. This break permits the charge on condenser 246 to discharge through a circuit traced from the upper plate of condenser 246, through the upper winding of relay 208, and through resistance 249 and potentiometer 250 to the lower plate of condenser 246. This discharge current insures that the reoperation of relay 208 will be prolonged for a minimum duration to compensate for any of the aforementioned electronic delay or foreshortening. The adjustment of potentiometer 250 can insure a minimum length or duration of operation of relay 208 irrespective of receiver electronic delays.

The signal receiver is arranged, as hereinbefore described in detail, to prevent its own operation on short pulses of pure tone signal appearing in voice currents, to foreshorten all pulses of tone signal, to prevent transmission of longer pulses below a minimum duration of pure tone signal in voice currents to the local trunk circuit as a signal, to guarantee transmission of a minimum duration of intentional signal to the local trunk or further tool facility and to transmit to the signaling conductor foreshortened signals caused by intentional tone signals of excessive duration.

Whenever the timing relay 253 is operated by the operation of the guard-removal relay 209 and the high level relay 202, condenser 348 is effectively inserted in parallel with condenser 313 of the signal channel discharge path to become charged in parallel therewith. The circuit is over the No. 1 front contacts of relay 253 to ground over the No. 6 front contacts of relay 202. Condenser 348 is of greater capacity than condenser 313 and consequently will maintain its charge longer. Under conditions where report signals are being transmitted over the toll line, as is explained subsequently, comprising on and off transmission of signal frequency impulses, the delaying action of condenser 348 will tend to keep tube 317 operated to compensate for the foreshortening of the signal impulses caused by the guard channel 315 and by the circuit elements comprising resistances 343 and 344, varistor 345, and condenser 346. It will be appreciated from the subsequent description of report signal conditions that the receiving circuit at the first toll office is required to operate when it is arranged to be selective to incoming frequencies (due to the release of relay 209) and when it has the added effect of condenser 348; but, the receiving circuit is called upon to release when it is non-selective but still having the effect of condenser 348. If condenser 348 were not present the release and operate times of the receiver might differ appreciably in spite of the change in selectivity condition. The added effect of condenser 348 on the operate and release times of tube 317 tends to equalize such time durations. In addition, the presence of the relatively large capacity 348 is insurance against the undesirable receiver release effect of possible discharge of condenser 313 on negative cycles of high power low frequency superimposed signal frequency, when the receiver is non-selective.

*Idle condition of all circuits*
(Continued)

It is proper now to return to the description of the idle condition of the receiving circuits, having a detailed understanding of certain peculiar characteristics of the behavior of the receivers. It will be remembered that a continuous low level pure signal tone of limited amplitude was impressed upon the discriminating network 312 after having been transmitted from the second toll office, over toll line TL2 or TL, through transformer 205 and through the amplifying and limiting stage comprising tube 301, transformer 303, varistors 304 and the low-pass filter comprising retard coil 305 and condensers 306 and 307. With the guard removal relay 209 released, terminal 1 of section 316 of the discriminating networks 312 is connected to the right-hand end of resistance 339 over conductor 337, the No. 6 armature and back contact of relay 209, and over conductor 336. With relays 209 and 206 released section 315 is shunted by resistance 243 in a circuit extending from terminal 3 of section 315, over lead 335, through resistance 243, over the No. 4 armature and back contact of relay 206, and over lead 244 to terminal 4 of section 315. Thus, both the guard channel 315 and the signal channel 316 are effective, the guard channel being limited in its effect by the resistance 243. Under the condition of continuous low level pure signal tone the signal channel 316 will charge condenser 313 but the guard channel 315 will not charge condenser 314 to any practical extent. As previously explained condenser 313 will discharge current from its top plate through resistances 342 and 343, through varistor 340, over conductor 244, over the back contact and No. 4 armature of relay 206, through resistance 243, and over conductor 335 to the bottom plate of condenser 313. When low level pure signal tone is present the grid voltage of tube 317 will be such, as a result of the voltage on condenser 313 and the voltages in the discharge path, that tube 317 will pass sufficient plate current to operate the remove-filter relay 318 in the plate circuit and the receiver relay 319 in the cathode circuit, which plate cathode circuit has been traced previously. Relay 318, when operated as shown in Fig. 3, has no effect upon the blocking network 320 because the sensitivity relay 206 is released. However, if multifrequency pulsing is used, the front contact on the armature 3 of relay 206 would be permanently connected to conductor 357 such that when the relay 318 operates it would insert filter 320. The section 321 of network 320 is in series between lead 251 and the grid of tube 300. Section 322 is bridged across the inward transmission channel composed of conductors 251 and 252 by means of conductors 356 and 357 over the No. 3 armature and back contact of relay 206. Sections 321 and 322 are resonant at the incoming signal tone frequency and, therefore, prevent said signaling tone from being transmitted to the local trunk circuit through amplifier 300, transformer 358, over leads 359 and 360, and through hybrid coil HC1. Relay 319, in operating, operates the regeneration relay 208 in a circuit extending from ground over the front contacts of relay 319, over the lower normal contacts of the R test jack, over conductor 327, over the No. 1 armature and back contact of sensitivity relay 206, over conductor 213, through resistance 214 and varistor 215, and through the lower winding of relay 208 to negative battery. As previously explained, relay 208, in operating as shown in Fig. 2, removes ground from signaling lead 170 connected to its armature. The lack of ground on conductor 170 is an indication to the local trunk circuit that the receiving circuits are registering an "on-hook" or idle condition of the remote office's calling equipment. In addition, relay 319, in operating, completes an operating circuit for the cut-off relay 203 extending from ground, over the front contacts of relay 319, over the upper normal contacts of the R test jack, over conductors 212 and 211, over the No. 5 armature and back contact of relay 202, through varistor 210, and through the winding of cut-off relay 203 to battery and ground. As previously explained, the operation of relay 203 effectively cuts and terminates the outward transmission channel, comprising tip conductor 233 and ring conductor 234, to prevent transmission over toll line TL1 or TL of noise or other audible tones originating in the local trunk circuit.

The receiver at the second toll office functions the same as the one at the first toll office described in detail above. An idle condition at both offices, therefore, grounds the signaling conductors 164 and 664 at the respective local trunk circuits for effecting the transmission from respective signal generators 200 and 400 continuous low level pure signal tone frequency over the toll facility to the other office. In the case of a four-wire toll facility both offices may transmit the same, say 1600 cycles per second, signaling frequency. In the case of a two-wire toll facility, however, the second toll office must transmit a different, say 2000 cycles per second, signaling frequency for obvious reasons. The respective receivers, under the influence of continuous low level signal tone incoming thereto, will, as above described, operate their respective remove-filter relays (318 and 518), receiver relays (319 and 519), regeneration relays (208 and 408) and cut-off relays (203 and 403). The incoming transmission channels at the respective offices (leads 251, 252 from transformer 205 and leads 451, 452 from transformer 405) are blocked by filter networks 320 and 520 to prevent transmission of incoming signal tone to the respective local trunk circuits through hybrid coils HC1 and HC2. Furthermore, in the case where Fig. 4B may be specified, respective filter networks 2000 and 3000 further block the incoming transmission channel against transhybrid and echo transmission of local signaling frequency to the corresponding local receiver to thereby permit the receiver to act in accordance with signal tone transmitted from the distant office without interference from local signals.

*Transmission and reception of a calling condition*

Assume now that the plug AP1 of the cord CD1 at the position OP1 in the first toll office is inserted into an answering jack to answer a call incoming over a recording trunk or an intertoll trunk or a trunk from a community dial office, that the operator has determined the destination of the call and that the plug CP1 of this cord CD1 is inserted into a jack associated with an outgoing trunk circuit over which the call may be extended, and that the trunk OT1 is associated with the jack J1 into which the plug CP1 is inserted. The insertion of plug CP1 into jack J1 closes a circuit for operating relay 104, thereby causing the operation of relay 110, as described in the aforementioned King et al. patent, and closes a circuit including conductor 102 for operatively energizing the upper winding of signaling relay 140 to operate relay 160. The operation of relay 110 disconnects the signaling conductor 170 from conductor 169 thereby to prevent the operation of relay 1003 of two-way trunk circuit TWT1 when ground is connected to signaling conductor 170, connects the answering supervisory relay 105 of the trunk circuit OT1 to conductor 170 and connects ground to conductor 168 to operate relay 1004 of two-way trunk circuit TWT1. Relay 1004 locks to conductor 168 independently of relay 1003 and further opens the connection between the winding of relay 1003 and the signaling conductor 170.

The operation of the outgoing trunk signaling relay 140 connects negative battery to conductor 164 through resistance 142 and over the right-hand contact and operated swinger armature of relay 140. Negative battery on lead 164 is applied through resistance 216 and over lead 217 to the mid-point of resistance 218 to create a greater negative potential on the left-hand side of varistors 219 and 220 than is created on the right-hand side of said varistors by the potentiometer comprising battery 224 and resistors 222 and 223. This reversal of polarity of voltage across varistors 219 and 220 causes said varistors to assume a relatively high internal resistance, which may be of the order of a million ohms or so, which effectively prevents any of the output signal tone generated by signal generator 200 from reaching the outward transmission path comprising tip conductor 233 and ring conductor 234.

Application of battery to lead 164 also operates the marking relay 201 in a circuit extending from ground, through the winding of relay 201, over conductor 217 and through resistance 216 to resistance battery on lead 164. Relay 201, upon operating, completes an operating circuit for the high level relay 202 extending from ground, over the No. 2 armature and front contact of relay 201, over the No. 2 armature and front contact of the operated cut-off relay 203, and to battery and ground through the winding of relay 202. Relay 202 operates in the latter circuit and locks independently of relay 203 over its No. 4 armature and front contact to ground over the No. 2 armature and front contact of relay 201. Relay 202, in operating, opens the operating circuit of relay 203 which releases. Relay 203 is a slow releasing relay. In some types of second toll offices, such as panel, cross bar and special step-by-step offices, the equipment for registering incoming direct current dial pulses or multifrequency dial pulse codes is not immediately available requiring that such offices transmit a "delay dial" signal to the remote sending office to delay the transmission therefrom of such dialing information. Other types of second toll offices, such as ordinary step-by-step offices, do not require such delay. At such called offices, which must send a "delay dial" signal to the originating office, the relay corresponding to 203, namely relay 403, will not release if such a "delay dial" signal is necessary. During the slow releasing time of relay 203 its cut and termination of the outward transmission path is effective to prevent noise in the local circuits from being transmitted thereover. Since no "delay dial" signal is sent by or is effective at the calling office, relay 203 will release to remove the effective cut and termination of the outward transmission channel at the first toll office.

The operation of relay 201 also operates the guard-removal relay 209 in a circuit extending from ground, over the front contacts of the receiver relay 319, which is operated under the assumption that low level signaling tone is being received from the second toll office, over the upper normal contacts of the R test jack, over conductor 212, over the No. 4 armature and front contact of relay 201 and to battery and ground through the winding of relay 209. Relay 209 operates in the latter circuit and locks independently of relay 201 to ground over its No. 4 armature and front contact, over the No. 5 armature and front contact of relay 202, over leads 211 and 212, and over the upper normal contacts of the R test jack to ground over the operated contacts of relay 319. Relay 209, in operating, completes a circuit for operating the timing relay 253 extending from ground, over the No. 6 armature and front contact of relay 202, over the No. 2 armature and front contact of relay 209 and to battery and ground through the winding of relay 253. Relay 253, upon operating, locks to ground, over its No. 2 armature and front contact and over the No. 2 armature and back contact of sensitivity relay 206.

The application of battery to lead 164 at the local outgoing trunk circuit OT1 has, therefore, resulted in the operation of the marking relay 201, the high-level relay 202, the guard-removal relay 209 and the timing relay 253, and the retarded release of the cut-off relay 203 to remove the effective cut of the outward transmission path. The high-level relay 202, upon operating, short-circuits the series resistances 229 and 230 to permit subsequent transmission of signal frequency from signal generator 200 over the outward transmission path to take place at a level higher than the previously described idle condition low level signal. These short-circuiting paths may be traced from the left side of resistance 229 to the right side thereof over the No. 2 armature and front contact of relay 202 and from the left to the right side of resistance 230 over the No. 1 armature and front contact of relay 202. The operation of the guard-removal relay 209, as has been described heretofore in detail, changes the characteristics of the local receiver to make it non-selective to incoming frequencies. This is accomplished, as will be remembered, by short-circuiting the terminals 3 and 4 of the guard channel 315 over leads 335 and 244 and over the No. 5 armature and front contact of relay 209 and by removing the short-circuit across resistance 245 at the No. 6 armature and back contact of relay 209 to thereby insert resistance 245 in series with leads 336 and 337 connecting terminal 1 of the signal channel 316 to the right side of resistance 339. This change in selectivity of the receiver will not alter the operation of relays 318 and 319 since low level signal tone is still incoming and will charge condenser 313 as before. The guard-removal relay 209, being quick operating, prevented the sensitivity relay 206 from operating over the No. 1 armature and front contact of relay 209 but permitted the timing relay 253 to operate following the operation of the high-level relay 202, whereupon relay 253 locked under the control of the released sensitivity relay 206. The operation of the timing relay 253 places additional short circuits across series resistances 229 and 230 of the signal tone transmitting circuit over its No. 3 and No. 4 armatures and front contacts over obvious circuits. Relay 253, upon operating, also applies positive battery through lamp 254 to the main anode 255 of the gas discharge timing tube 256 over the No. 5 armature and front contact of relay 253. Condenser 257, in the triggering circuit of the starting anode 258 of tube 256, is prevented from charging up to the triggering potential due to the ground applied to the right-hand end of resistance 259 over lead 260 and over the No. 3 armature and front contact of relay 209.

The discontinuance of the transmission of signal tone from the first toll office is recognized at the receiver of the second toll office as a calling signal from the first office. The removal of signal tone from toll line TL1 and from conductors 530, 440, 442 and 441, comprising in conjunction with transformer 405 the input circuit for tube 501 of the receiver at the second toll office, removes the grid input voltage to tube 517 resulting in a reduction or complete cessation of plate current flow in tube 517 to thereby release the remove-filter relay 518 and to release the receiver relay 519, which, although slow operating, is fast releasing due to the unidirectional character of varistor 561. Relay 519, in releasing, opens at its contacts the operating circuit for the regeneration relay 408, which thereupon releases. The release of relay 408 applies ground over its lower left contact and swinger armature to signaling lead 670 to the local trunk circuit. The release of relay 519 also opens the operating path of the cut-off relay 403 which proceeds to release slowly and will completely release because no "delay dial" signal is received from the local trunk circuit before it can release. The release of the remove-filter relay 518 has no effect at this time, except in the case of multifrequency dialing, as above described, whereupon the release of relay 518 removes the filter 520.

The release of relay 408, in addition to applying ground to signaling conductor 670 to initiate the trunk circuit operation to be described directly, permits condenser 446 to acquire a charge in the circuit from ground and negative battery through resistance 447 and varistor 448, through condenser 446 and over both left-hand contacts and swinger armature of relay 408 back to ground. As previously explained, the charge on condenser 446 is utilized in making relay 408 slow releasing once it has been reoperated to insure a full length signal (comprising an open-circuited lead 670) to the trunk circuit irrespective of the previously described foreshortening of signal tone pulses and electronic delays of the receiver. Ground on conductor 670 causes the operation of relay 6003 of the two-way trunk circuit TWT2 in a circuit extending from ground on lead 670, over the back contacts of relay 610 of trunk circuit OT2, over conductor 669, over the back contacts of relay 6004 of trunk circuit TWT2, over the back contacts of relay 6007, and to battery and ground through the winding of relay 6003. Relay 6003, in operating, connects ground over its No. 4 armature and front contact to conductor 668 to guard the trunk circuit OT2 from being seized on an outgoing call. Relay 6003, in operating, also completes a circuit for operating relay 6005 of the trunk circuit TWT2 and for the line relay 6057 of the trunk route selector TS2. The latter circuit may be traced from ground on lead 670, over the back contacts of relay 610 of trunk circuit OT2, over lead 669, over the back contacts of relay 6004 of trunk circuit TWT2, through the winding of relay 6005, over the No. 1 armature and front contact of relay 6003, over lead 667, through resistances 621 and 622 in simplex, over the back contacts of relay 620, through the windings of the retard coil 660, over conductors 661 and 662, over the Nos. 2 and 3 armatures and back contacts of relay 630, over conductors 6001 and 6002, over the Nos. 2 and 3 armatures and front contacts of relay 6003, over the Nos. 1 and 2 armatures and back contacts of relay 6060 of the selector TS2, through resistances 6061 and 6062 in simplex, through resistance 6063, over the No. 5 armature and back contact of relay 6060, to battery and ground through the winding of relay 6057. Relays 6005 and 6057 both operate over the latter circuit. Relay 6005, upon operating, closes a circuit from ground, over its No. 2 armature and front contact and through resistance 6006 to the winding of relay 6003 to hold same operated. Relay 6005, in operating, also completes an obvious circuit for operating the slow-to-release relay 6007. Relay 6007, upon operating, closes an additional circuit from ground over its No. 1 armature and front contact for holding relay 6003 operated, opens at its No. 2 armature and back contact the operating circuit for relay 6003 and connects ground over its No. 3 armature and front contact to conductor 6053 of selector TS2 to hold the selector TS2 and any additional selector through which the connection is extended in the second toll office until the connection is released at the first toll office.

*Dialing routing digit*

If the dialing is to be accomplished on a multifrequency basis the circuits at both offices remain ineffective so long as the frequencies used in the multifrequency dial signaling do not comprise the supervisory signal tone frequencies used by the two offices.

It being assumed that no delay in dialing is necessary (the effect of a "delay" or "stop dial" signal will be described hereinafter), if the dialing is to be accomplished on a dial pulse basis the operator at the first toll office operates the dialing key (not shown) to place the upper winding of relay 140 under the control of the impulse contacts of the dial at position OP1 over conductor 102, the No. 4 armature and back contact of relay 130, over conductor 106 to ground through the upper winding of relay 140. Each release and reoperation of relay 140 in response to the dialing of the first routing digit of the called number alternately places ground and battery on conductor 164. Ground on leads 164 and 217, as has been explained, reverses the polarity of voltage across varistors 219 and 220 to again permit transmission of signal tone over toll line TL1 or TL, this time at a high level since relay 202 is operated thereby short-circuiting the series resistances 229 and 230. Ground on leads 164 and 217 also permits relay 201 to release. The release of relay 201 completes the operating circuit for relay 203 from ground, over the No. 2 armature and back contact of relay 201, over the No. 3 armature and front contact of relay 202, through varistor 261, to battery and ground through the winding of relay 203. When battery is again placed upon conductors 164 and 217, relay 201 reoperates. Relays 203 and 202 remain operated during impulses of a digit due to their slow releasing characteristics and relay 201 releases during the impulses and reoperates at the ends thereof. At the end of the digit, relays 201 and 202 remain operated and relay 203 will slowly release. Each time that leads 164 and 217 are changed from battery-to-ground-to-battery a single pulse of signal tone is transmitted to the second toll office over toll line TL1 or TL.

At the receiver of the second toll office the arrival of each tone pulse causes the operation of the receiver relay 519 and the remove-filter relay 518 as hereinbefore described. The relay 518, in operating accomplishes no useful function at this time. Relay 519, in operating, causes the operation of the regeneration relay 408 to thereby remove ground from lead 670 to the local trunk circuit. When each incoming tone pulse ceases, the relays 518, 519 and 408 release to thereby place ground upon lead 670. Thus the dialed digit is repeated on lead 670. It will be remembered that, due to the retarded release characteristic of relay 408, the electronically foreshortened tone pulses are repeated as direct current open-circuit pulses of a guaranteed minimum length, and unduly long tone pulses are shortened.

Both calling and called circuits will return to their respective conditions after dialing as before dialing except for whatever effect the pulses on lead 670 may have had on such other equipment as the trunk circuits of the second toll office. Each time lead 670 is disconnected from ground, in response of the receiver at the second toll office to the "dialed" tone pulses, relays 6005 and 6057 release. Also each time lead 670 is grounded relays 6005 and 6057 reoperate. Relay 6007, whose operating circuit is under control of relay 6005, is slow releasing and is unaffected by the momentary release of relay 6005 in response to each pulse of each digit. Each release of relay 6057 causes the operation of the vertical stepping magnet (not shown) of selector TS2 whereby the brushes 6071, 6072, 6073 and 6074 are stepped up to the level corresponding to the digit dialed. At the end of this train of impulses, the brushes are advanced step by step in the selected level until a set of terminals connected to an idle trunk or succeeding selector are encountered; whereupon relay 6060 is operated to extend the connection to the selected switch or trunk, all in the usual and well-known manner.

Each succeeding train of dial impulses created by operation of the calling operator's dial is repeated by relay 140 which alters the transmitting character of varistors 219 and 220 to transmit a corresponding train of impulses of voice frequency signaling current over toll line TL1 or TL to operate relay 408; and the operation of relay 408 effects the transmission of corresponding trains of impulses, through brushes 6071 and 6072 and the selected terminals of selector TS2, to operate succeeding switches through which the connection is extended or to operate digit registers. When dialing is completed, the dial key (not shown) is restored to normal and relay 130 is operated in the manner described in the aforementioned King-Miller and Walsh patents to complete the talking connection between cord CD1 and hybrid coil HC1.

*Transmission and reception of a "delay dial" or "stop dial" signal*

The various levels on selector TS2 may represent toll routes to various types of terminating or tandem equipment such as panel, cross bar, or link-type step-by-step offices which contain equipment designed to register incoming pulse signal, which equipment is not immediately available. It must be connected by switching means. When the selected level terminates in an ordinary step-by-step office there is no such additional switching operation required. Wherever such switching is required, a "stop dial" signal is transmitted from the terminating equipment to indicate to the originating office that such equipment is not yet available, and, therefore, the transmission of pulse signaling should be stopped or delayed until such equipment is available for receiving and registering same.

If such a delay is required, relay 6034 will be operated as soon as brush 6074 of selector TS2 makes contact with terminal 6075 and as soon as connector relay 6060 operates, as described in the aforementioned King-Miller patent. Relay 6034, in operating, completes the operating circuit for relay 6011 from ground, over the front contacts of relay 6034, terminal 6075 and brush 6074 of selector TS2, over the No. 4 armature and front contact of connector relay 6060, to battery and ground through the winding of relay 6011. Relay 6011, upon operating, places resistance battery on lead 664 from battery through resistance 642, over the front contacts of relay 6011, and over the swinger armatures and right-hand contacts of relays 6010 and 640. Battery on lead 664 causes varistors 419 and 420 to assume high impedances to effectively cause cessation of low level transmission of tone signal to the first toll office. Battery on lead 664 also causes operation of relay 401 over an obvious circuit. If the cut-off relay 403 has released, the operation of relay 401 will reoperate relay 403 in a circuit extending from ground, over the No. 2 armature and front contact of relay 401, over the No. 3 armature and back contact of the high-level relay 402, through varistor 461, and to battery and ground through the winding of relay 403. Relay 403, in operating, completes the operating circuit for relay 402 from ground, over the No. 2 armature and front contact of relay 401, over conductor 462, over the No. 2 armature and front contact of relay 403, to battery and ground through the winding of relay 402. Relay 402, upon operating, opens at its No. 3 armature and back contact, the operating circuit for relay 403 which slowly begins to release. If the cut-off relay 403 had not released at the time the relay 401 was operated, relay 402 will be operated as above followed by the slow release of relay 403. In either case relay 403 will eventually release to remove the effective cut and termination of the outward transmission channel to toll line TL2 or TL. Since the receiver relay 519 is released, the operation of relay 401 will not operate the guard-removal relay 409, and, therefore, a circuit is completed for operating the sensitivity relay 406 from ground, over the No. 6 armature and front contact of the operated relay 402, over the No. 1 armature and back contact of the timing relay 453, over the No. 1 armature and back contact of relay 409, over the No. 1 armature and front contact of marking relay 401, and to battery and ground through the winding of sensitivity relay 406. In addition, in the case of two-wire toll line operation as shown in Fig. 4B, the operation of relays 402 and 401 provides an operating path for the filter relay 3001 extending from the previously traced ground, over the No. 1 armature and front contact of relay 401, over conductor 463, to battery and ground through the winding of filter relay 3001. The operation of relay 3001 removes from the inward transmission channel a network 3004 tuned to the outgoing tone signal frequency at the second toll office. As has been explained, the operation of the sensitivity relay 406, lowers the sensitivity of the receiver at the second toll office and removes the shunting of the guard channel 515 by resistance 443 to thereby increase the relative guard to signal efficiency of the receiver. The operation of the relay 406 opens at its No. 1 armature and back contact the operating circuit of regeneration relay 408 and completes an obvious operating circuit for the rering relay 464 over its No. 2 armature and front contact to ground. Relay 464, in operating, provides over its No. 2 armature and front contact an additional ground for holding relay 402 operated over the No. 4 armature and front contact of relay 402. Relay 464 partially completes at its No. 3 armature and front contact a circuit from ground, over the No. 3 armature and back contact of relay 409 to the No. 4 armature of relay 401 and from the lowermost back contact of relay 401, over the No. 3 armature and front contact of relay 464, over conductor 465, over the lowermost normal contacts of the D. C. test jack, and over conductor 562 to the left side of the winding of relay 401, whereby when relay 401 releases, as a result of battery being removed from conductor 664, the latter circuit will be completed over the lowermost back contacts of relay 401 and said relay cannot be reoperated until slow-releasing relay 464 releases to remove the ground shunt across the winding of relay 401. This delay will insure a minimum length of transmitted tone from the second toll office to the first when battery is removed from conductor 664. Furthermore, when relay 464, is operated, it completes an obvious operating circuit for the out-filter relay 466 to ground over the No. 1 armature and front contact of relay 464. The operation of relay 466 removes from the outward transmission channel the blocking network 467 which is tuned to the signal tone frequency transmitted normally from the second toll office.

The discontinuance of the signal tone transmission to the first toll office results in the release of the remove-filter relay 318 and of the receiver relay 319. The release of relay 319 results in the release of the regeneration relay 208. Relay 208, in releasing, connects ground to conductor 170 which is interpreted by the local trunk circuit as a "stop dial" signal. Ground on conductor 170 operates the supervisory relay 105 of trunk circuit OT1 over the No. 1 armature and front contact of relay 110. Relay 105, upon operating, opens at its No. 2 armature and back contact the circuit including the low resistance winding of relay 104 and the calling supervisory lamp CS. Negative battery is connected to conductor 106 over the No. 1 armature and front contact of relay 105 but this has no effect upon relay 140 since negative battery is already connected thereto from the operator's dial normal. Lamp CS is extinguished to inform the operator at position OP1 that further dialing should be forestalled. The release of the receiver relay 319 releases relay 209. The release of relay 209 removes at its No. 3 armature and front contact the ground on lead 260 thereby allowing condenser 257 of the timing circuit to begin to acquire a charge.

If the "stop dial" signal is of sufficient duration condenser 257 will become charged to the striking potential of tube 256 whereupon tube 256 fires and produces a discharge current which flows through the lower winding of the differentially wound timing relay 253 to neutralize the effect of the upper energized winding. Relay 253 will thereupon release to complete an operating circuit for the sensitivity relay 206 extending from ground, over the No. 6 armature and front contact of relay 202, over the No. 1 armatures and back contacts of relays 253 and 209, over the No. 1 armature and front contact of relay 201, to battery and ground through the winding of relay 206. Relay 206, upon operating, in addition to altering the sensitivity of the receiver, completes an obvious circuit for operating the rering relay 264 at the No. 2 armature and front contact of relay 206 and opens at its No. 1 armature and back contact the operating circuit for relay 208. Rering relay 264, in operating, provides over its No. 2 armature an additional holding ground for the high-level relay 202, completes at its No. 3 armature and front contact an obvious circuit for operating relay 266, and at its No. 1 armature and front contact partially completes the shunting ground for the right-hand side of relay 201 to insure a minimum release time for relay 201 when battery is removed from leads 164 and 217 as has been explained in connection with similar relays of the second toll office.

If the "stop dial" signal is of short duration the timing relay 253 will not release because condenser 257 will not have had sufficient time to acquire a voltage which will initiate a discharge in tube 256. Therefore, neither relay 206 nor relay 264 nor relay 266 will operate before relay 209 reoperates, as will be explained, to recondition the control relays 209, 206, 253, 264 and 266 as they were before the "stop dial" signal was received.

*Transmission and reception of a "start dial" signal*

When the terminating equipment is ready to receive pulses, relay 6034 of the selector TS2 is released thereby releasing relay 6011 which replaces the battery on lead 664 by ground. Ground on lead 664 reverses the polarity of voltage across varistors 419 and 420 to thereby allow their internal resistances to decrease to effectively cause the immediate transmission of tone signal over toll line TL2 or TL. Such signal will be transmitted at a high level because relay 402 is operated, thereby short-circuiting the series resistances 429 and 430. Ground on conductor 664 shunts the winding of the marking relay 401 which thereupon releases. The release of relay 401, completes an operating circuit for the cut-off relay 403 from ground, over the No. 2 armature and back contact of relay 401, over the No. 3 armature and front contact of relay 402, to battery and ground through varistor 461 and the winding of relay 403, which relay thereupon operates to cut and terminate the outward transmission path. The release of relay 401 releases the filter relay 3001, if a two-wire toll line is in use, to insert network 3004 into the inward transmission path at the second toll office to greatly reduce the effect upon the receiver at the second toll office of transhybrid or echo currents of the signal frequency transmitted from the second toll office. Along with the release of the filter relay 3001, the release of relay 401 causes the release of the sensitivity relay 406. Relay 406, upon releasing, returns the receiver to its normal sensitivity and normal signal-to-guard efficiency, and at its No. 1 armature and back contact partially recloses the operating circuit for relay 408. The release of relay 406 opens the operating circuit for relay 464 which releases slowly due to the short-circuiting effect of varistor 468 and potentiometer 469. Relays 402 and 403 will remain operated until relay 464 releases. During the releasing time of relay 464 when relay 402 remains operated, high level tone will be transmitted. When relay 464 releases, relay 466 will release and relay 402 also releases to thereby reinsert series resistances 429 and 430 into the output circuit from tone generator 400 to thereby decrease the level of transmission of tone signal. Relay 403 slowly releases following the release of relay 402, as has been explained, to remove the cut and termination of the outward transmission channel.

At the first toll office, the reception of the high level tone signal causes the receiver to operate the remove-filter relay 318 and the receiver relay 319. The relay 318, in operating, rapidly reinserts the blocking network 320 into the inward transmission path if the relay 206 is operated, as will be remembered was the case where the "stop dial" signal was of sufficient duration to cause the release of the timing relay 253. Thus, only a small spurt of incoming signal tone is permitted to be transmitted to and through hybrid coil HC1. If the sensitivity relay 206 was unoperated, as was the case when the "stop dial" signal was of insufficient duration to cause the release of the timing relay 253, the operation of the relay 318 at this time has no effect because the filter 320 is already inserted in the incoming channel. As will be remembered, however, if multifrequency signaling is employed, the operation of relay 318 would insert filter 320 irrespective of the status of relay 206. If the relay 206 were unoperated, the operation of the receiver relay 319 operates the regeneration relay 208 in a previously traced circuit over the front contact of relay 319 and over the back contact and No. 1 armature of relay 206. The operation of relay 208 removes ground from lead 170 to the local trunk circuit as a "start dial" signal. The operation of relay 319 also operates the guard-removal relay 209 in a previously traced circuit over the front contact of relay 319 and over the front contact and No. 4 armature of relay 201. The relay 209, in operating, grounds lead 260 to prevent the timing tube 256 from triggering and causes the receiver to become non-selective to incoming frequencies. If relay 206 were operated and relays 209, 208 and 253 were released as a result of a sufficiently long "stop dial" pulse to trigger tube 256, then the operation of receiver relay 319 causes the operation of relay 209 and relay 253. The operation of relay 209 causes the release of relay 206, which is slow releasing due to the short-circuiting effect of varistor 270 and potentiometer 271 over the No. 1 armature and front contact of relay 201. The release of relay 206 completes at its No. 1 armature and back contact the operating circuit for relay 208 which operates to remove ground from lead 170 to the local trunk circuit. The release of relay 206 releases slow-releasing relay 264 which in turn releases relay 266. As a result of these relay operations, as will be remembered from previous description, the circuit at the first toll office is ready to transmit high level tone signal, its receiver is arranged for low sensitivity but is not selective to incoming frequencies and all blocking networks are effective. Removal of ground from conductor 170 releases relay 105 thereby completing at the No. 2 armature and back contact of relay 105 a circuit through the low resistance lower winding of relay 104 and the calling supervisory lamp CS to battery and ground to cause lamp CS to light to thereby provide the operator with a "start dial" signal.

*Dialing succeeding digits*

As previously outlined, if succeeding switch operations are necessary, each operation of the dial at the operator's position OP1 creates a train of impulses which are repeated by relay 140 which alters the transmitting character of varistors 219 and 220 to transmit a corresponding train of impulses of voice frequency signaling current over the toll line TL1 or TL to control the relay 408; and the operation of relay 408 in response to these impulses of voice frequency current effects the transmission of corresponding trains of impulses, through brushes 6071 and 6072 and over the selected terminals of selector TS2, to operate succeeding switches through which the connection is extended or to operate digit registers. When dialing is completed, the dial key (not shown) is restored to normal and relay 130 is operated in the manner described in the aforementioned King-Miller and Walsh patents to complete the talking connection between cord CD1 and hybrid coil HC1.

*Called subscriber answers*

It will be assumed that the call in question is one which is routed through selector TS2 and over a level thereof which terminates in a selected idle incoming trunk circuit to a toll operator's position in the second toll office and that the selected trunk circuit is the trunk circuit IT2 terminating at jack J8. In this case relay 6034 will not be operated, as in the case when a "stop dial" signal was necessary. However, the operation of connector relay 6060 of selector TS2 closes a circuit for operating line relay 6055 of the trunk circuit IT2. This circuit is traced from ground on the lower left contact of relay 408, over the swinger armature of relay 408, over conductor 670, over the No. 2 armature and back contact of relay 610 of the outgoing trunk circuit OT2, over conductor 669, over the back contact of relay 6004, through the winding of relay 6005, over the No. 1 armature and front contact of relay 6003, over conductor 667, through resistances 621 and 622 in simplex, over the back contacts of relay 620, through the windings of retard coil 660, over conductors 661 and 662, over the Nos. 2 and 3 armatures and back contacts of relay 630, over conductors 6001 and 6002, over the Nos. 2 and 3 armatures and front contacts of relay 6003, over the Nos. 1 and 2 armatures and front contacts of relay 6060, through brushes 6071 and 6072 of selector TS2, over conductors 6021 and 6022 of trunk circuit IT2 through the windings of retard coil 6000, through resistors 6015, 6016 and 6017, over the back contacts of relay 6019 in simplex, to battery and ground through the winding of relay 6055. Relay 6055 operates in series with relay 6005 which holds relay 6007 operated to maintain ground on conductor 6053. Relay 6055, in operating, closes an obvious circuit for lighting lamp L8. When the plug of a cord CD2 at a position OP2 is inserted into jack J8 to answer the call, the lamp L8 is extinguished and a talking connection is completed through condensers 6050 and 6051. Relay 6034 is operated in the manner described in the aforementioned patent to J. E. Walsh and closes a circuit from ground, over conductor 6044, over terminal 6075 and brush 6074 of selector TS2, over the No. 4 armature and front contact of relay 6060, to battery and ground through the winding of relay 6011 of the two-way trunk circuit TWT2. The operation of relay 6011 replaces ground on conductor 664 by battery through a resistance 642. Battery on conductor 670 effectively causes cessation of low level signal tone transmission over toll line TL2 or TL. Battery on conductor 670 operates relay 401 which operates the cut-off relay 403 which in turn permits the operation of relay 402 which in turn permits relay 403 to slowly release, as has been fully described hereinbefore in connection with the effect of a "stop dial" signal. Also, as has been described, the operation of relays 401 and 402 completes the operating circuits for the sensitivity relay 406 and the filter relay 3001. The operation of the relay 406 completes the operating circuit for the rering relay 464, which thereupon operates to provide an additional holding path for the high level relay 402, and to operate the out-filter relay 466. All of these relay operations have been discussed in detail hereinbefore with respect to a "stop dial" signal except that under the latter condition battery on conductor 664 was replaced by ground when the terminating equipment was ready to receive digital pulsing. Under the present circumstances such change from battery to ground on conductor 664 will not take place unless the answering operator disconnects, which, for the present, it is assumed does not occur. The operation of the high level relay 402 short-circuits resistances 429 and 430 to permit high level signal tone transmission when ground is again placed on conductor 664. The operation of relay 406 increases the guard-to-signal efficiency of the receiver. The operation of relay 466 removes the blocking network 467 from the outward transmission path and the operation of relay 3001 removes the blocking network 3004 from the inward transmission path.

At the first toll office, the removal of incoming low level signal tone from the toll line TL2 or TL effects the release of relays 318 and 319. The release of relay 318 with relay 206 released has no effect upon the blocking network 320 except in the above-mentioned case of multifrequency signaling where the release of relay 318 would remove network 320. The release of relay 319 releases relay 208 which thereupon places ground on signaling conductor 170 as an indication of an answer or "off-hook" condition at the second toll office. The release of the receiver relay 319 releases the guard removal relay 209. The release of relay 209 reinserts the guard channel 315 shunted by resistance 243, and increases the selectivity of the signal channel 316 by short-circuiting the series resistance 245. The release of relay 209 also removes the ground from lead 260 to permit condenser 257 to acquire a charge. Condenser 257 will acquire sufficient charge to fire tube 256 and thereby release the timing relay 253 unless relay 209 is reoperated to apply ground to conductor 260 before condenser 257 has been charged to the striking voltage of tube 256. It has been assumed that the operator at the second toll office does not disconnect and so relay 209 will not be reoperated prior to the firing of tube 256. The release of relay 253, resulting from the firing of tube 256, operates relays 206 and 2001 (if used). Relay 206, upon operating, decreases the sensitivity of the receiver, removes the shunting of guard channel 315 by resistance 243 to increase the relative guard-to-signal efficiency of the receiver, makes the incoming transmission channel non-selective to incoming frequencies by eliminating the filter 320, opens another point in the operating path of the relay 208 and operates the rering relay 264. The relay 264, upon operating, operates the out-filter relay 266 to remove blocking network 267 from the local outward transmission path. Ground on conductor 170 operates the supervisory relay 105 of trunk circuit OT1 to extinguish the calling supervisory lamp CS, as was the case with the "stop dial" signal, to inform the local calling operator that the call has been answered and the calling operator, by restoring to normal the dial key (not shown), may operate relay 130 to complete the talking connection, as described in the aforementioned King-Miller and Walsh patents.

*Transmission and reception of a rering signal*

With the circuits arranged as established in the above section but assuming that the operator at the first toll office has not returned her dial key (not shown) to normal and has not operated the cut-through relay 130, it may be necessary for the operator at the second toll office to send a recall signal to obtain the attention of the calling operator, or such a signal may be sent from the calling operator to the called operator as a rering signal as will be appreciated. The condition at both offices is that the following relays will be operated: marking relays 201 and 401; high level relays 202 and 402; rering relays 264 and 464; sensitivity relays 206 and 406; filter relays 2001 and 3001; out-filter relays 266 and 466; and no tone signal is being transmitted in either direction. The trunk circuit at the first toll office is aranged to transmit a short pulse of direct current to the signaling circuit which in turn transmits a signal comprising high level tone to the second office as a rering signal. Such a signal cannot be long enough to be interpreted at the called end as a "disconnect" signal. Furthermore, if such a short pulse is transmitted, the electronic and mechanical delays of the receiver at the second toll office will result in such signal not even being registered. Such a condition is provided for, as has been explained previously, in the slow release of rering relay 264 which maintains a ground shunt across the winding of the marking relay 201 when the latter releases thereby insuring that relay 201 cannot reoperate for a guaranteed minimum duration of time. This ground, appearing also on conductor 217 maintains high level transmission until relay 264 releases to remove ground from conductor 217. The sequence of operations at the first toll office is as follows: The operator at the first toll office, in order to transmit a rearing signal, effects the momentary release and reoperation of relay 140. The short release of relay 140 replaces battery on lead 164 by ground and reapplies battery thereto when relay 140 reoperates. Ground on lead 164 effects transmission of high level tone over toll line TL1 or TL. Ground on lead 164 also releases relay 201. Since relay 202 is operated and locked operated over the No. 2 armature of the operated rering relay 264, the release of relay 201 operates the cut-off relay 203 from ground over the No. 2 armature and back contact of relay 201 and over the No. 3 front contact of relay 202 in an obvious circuit through varistor 261. Relay 203, in operating, as has been discussed, cuts and terminates the outward transmission channel. The release of relay 201 also completes a circuit to ground from the right side of its winding over conductor 362, over the lower normal contacts of the DC test jack, over conductor 265, over the No. 1 armature and front contact of relay 264, over the No. 3 armature and back contact of relay 201, to ground over the No. 3 armature and back contact of relay 209. This shunt across the winding of relay 201 will be maintained until slow-releasing relay 264 releases. Thus, no matter how quickly the operator reapplies battery to lead 164, relay 201 remains released and high level tone transmission is continued. Relay 201 in releasing releases relays 206 and 3001. The release of relay 206 permits relay 264 to start releasing. Eventually relay 264 will release to release relay 266 and to permit relay 201 to reoperate thereby retaining relays 202 and 203 operated, assuming battery has been reapplied to lead 164. The reoperation of relay 201 and continued operation of relay 202 eventually releases relay 203. Operation of relays 202 and 201 operates relays 2001 and 206 which latter relay 206 in turn reoperates relay 264 which reoperates relay 266. Thus the circuits are again in the same condition as before the transmission of the rering signal and such has been transmitted to the first toll office as a guaranteed minimum duration of high level signal tone.

At the second toll office, the pulse of high level signal tone reoperates relays 518 and 519 followed by the early release of these relays at the cessation of said pulse. Operation of relay 518 inserts the blocking network 520 and the release of the sensitivity relay 406 has no effect thereon. Thus a very short spurt of tone signal will be transmitted by tube 500 and hybrid coil HC2. Relay 519, in operating, operates relay 409 over lead 412 and the No. 3 front contacts of relay 401. Relay 409 locks to the same conductor over the No. 5 front contacts of relay 402. Relay 409, in operating, opens at its No. 1 back contacts the operating circuit for relays 3001 and 406, which latter relay 406 slowly releases under control of varistor 470 and potentiometer 471. Potentiometer 471 is adjusted such that the No. 1 back contacts of relay 406 close the operating path for relay 408 prior to the release of relay 519 resulting from the end of the received rering signal. This insures the operation of relay 408 which thereby removes ground from lead 670 as a rering signal, in response of the relay 519 to the shortest expected duration of rering signal. The operation of relay 409 completes over its No. 2 front contacts an operating circuit for relay 453 which operates and places battery on the charging circuit for condenser 457 which, however, will not charge up and fire tube 456 until relay 409 releases to remove ground from lead 460. Relay 453, upon operating, further opens at its No. 1 back contacts another point in the operating circuit of relay 406 such that relay 406 cannot reoperate until relay 453 releases. The release of relay 406 provides a locking circuit over its No. 2 back contacts for relay 453 and permits relay 464 and consequently relay 466 to release. Relays 518 and 519 were released shortly after relay 406 operated, relay 519 thereby releasing relay 409. Release of relay 409 permits condenser 457 to acquire a charge to eventually release relay 453. Release of relay 453 permits relays 3001 and 406 to reoperate, relay 406 in turn reoperating relays 464 and 466. The circuit is, therefore, returned to its condition prior to receipt of the rering signal, which, as above described, has effected a momentary open circuit on conductor 670 as such signal.

*Control of echo effects*

In the previous description reference from time to time has been made to blocking networks 320 and 520 in the inward transmission paths at the two toll offices, to blocking networks 267 and 467 in the outward transmission channels, to blocking networks 2004 and 3004 in the inward channel of the two-wire to four-wire termination of toll line TL, and to one-way amplifiers such as 204, 404 and 300, 500. It can be shown, as will be appreciated from previous description, that networks 267 and 467 which are tuned to the frequency of tone signal transmitted from the associated transmitters 200 and 400 will prevent signal tone frequency components of voice current originating at the associated operator's position from affecting the remote receiver sensitive to such frequency. Also, one-way amplifiers 204 and 404 prevent the appearance in the local trunk circuit of tone signal and noise transmitted through transformers 238 and 438. Also, blocking networks 320 and 520 are provided to prevent pure signal tone frequency from being transmitted to the local trunk circuits through amplifiers 300 and 500 and through hybrid coils HC1 and HC2. The one-way amplifiers 300 and 500, of course, will minimize the transmission of noise locally generated from being transmitted over the toll lines and possibly into the local receiver. The networks 2004 and 3004 prevent locally generated signal tone frequency from being reflected back to the local receivers through hybrid coils HC3 and HC4. Furthermore, the one-way amplifiers 2003, 3003 and 2005, 3005 confine all transmission in their respective outgoing and incoming channels to outgoing and incoming signaling or voice currents, respectively.

*Calling operator disconnects first*

When the calling operator disconnects plug CP1 from jack J1, relays 104 and 130 release. The release of relay 104 causes the release of relay 110 which in turn releases relays 105, 140 and 1004. The release of relay 140 applies ground to conductor 164. Ground on conductors 164 and 217 permits transmission of high level tone because relay 202 in being operated short-circuits the series resistances 229 and 230. Ground on conductor 217 shunts the winding of relay 201 which thereupon quickly releases. The release of relay 201 operates the relay 203 in a circuit from ground over the No. 2 back contacts of relay 201, over the No. 3 front contacts of relay 202, through varistor 261, to battery and ground through the winding of relay 203. The release of relay 201 permits relay 206 to quickly release, since it is not under control of varistor 270 and potentiometer 271, to return the associated receiver to its normal sensitivity. The release of relay 206 permits relay 264 to slowly release under the control of varistor 268 and potentiometer 269. In the meantime, upon the release of relay 201, relay 2001 also is released. As soon as relay 264 releases, relays 202 and 266 release. The release of relay 202 releases relay 203 and removes the short circuit from resistances 229 and 230. Thus, the disconnect has transmitted a pulse of high level tone followed by low level tone.

At the called office, the receipt of high level tone operates relays 518 and 519. The operation of relay 519 operates relay 409 over lead 412. Relay 409, in operating, operates the timing relay 453, the associated timing circuit of which is prevented from triggering due to the presence of ground on conductor 460 from the No. 3 front contacts of relay 409. The operation of relay 409 opens at its No. 1 back contacts the operating circuit for relay 406 which slowly released under the control of varistor 470 and potentiometer 471. The opening of the latter circuit for relay 406 permits relay 3001 to release. As soon as relay 406 releases, the associated receiver is returned to normal sensitivity, a holding circuit is provided for relay 453 over the No. 2 back contacts of relay 406, and the operating circuit is completed for relay 408. Relay 408 in operating, removes ground from conductor 670. The removal of ground from conductor 670 releases relay 6005 of trunk circuit TWT2 and the line relay 6055 of trunk circuit IT2. The continued release of relay 6005 releases relays 6007 and 6003 of trunk circuit TWT2 and the release of connector relay 6060 of the selector TS2 whereby selector TS2 is restored to normal in the usual and well-known manner. The release of relay 6003 also removes ground from conductor 668. The release of connector relay 6060 releases relay 6011. The release of relay 6011 replaces battery on conductor 664 by ground. Ground on conductor 664 permits transmission of high level tone over toll line TL2 or TL and releases relay 401. The release of relay 401 permits relay 406 to quickly release if still operated due to its slow releasing action under the control of varistor 470 and potentiometer 471, and operates relay 403 over the No. 2 back contacts of relay 401. The release of relay 406 provides a locking path over its No. 2 back contacts for the timing relay 453, returns the associated receiver to its normal sensitivity, and opens at its No. 2 front contacts the operating circuit for relay 464 which thereupon slowly releases under the action of varistor 468 and potentiometer 469. The release of relay 401 opens the operating circuit for relay 409 which nevertheless is locked operated under the control of relay 402 which will not release until relay 464 releases. The release of relay 464 releases relay 466 and effects the release of relay 402 which releases relays 409 and 403. The release of relay 402 does not remove the short circuits across resistances 429 and 430 because the operated relay 453 maintains said short circuits. Thus, low level tone will not follow the high level tone being transmitted until relay 453 releases. The release of relay 409 removes, at its No. 3 front contacts the ground from conductor 460 to permit condenser 457 to acquire a charge and fire tube 456 to thereby release relay 453. The release of relay 453 changes the transmitted tone from high level to low level.

The receipt of high level tone at the calling end effects the operation of relays 318 and 319. The operation of relay 319 operates relays 208 and 203. The operation of relay 208 removes ground from conductor 170 to return the calling end to normal, with the following relays operated at both offices: 208 and 408, 203 and 403, 319 and 519, 318 and 518; and low level tone signal being transmitted in both directions.

*Disconnect of calling operator before called operator answers*

If the called operator does not answer the call by plugging cord CD2 into jack J8 to operate relay 6034, the calling operator may disconnect. Under these conditions the following relays will be operated at the calling office: relays 104, 110 and 140 of the trunk circuit OT1; relay 1004 of trunk circuit TWT1; marking relay 201, high level relay 202, guard removal relay 209, timing relay 253, receiver relay 319, remove-filter relay 318, and regeneration relay 209. Under these conditions no tone is being transmitted to the second toll office wherein the following relays will be operated: relays 6003, 6005 and 6007 of trunk circuit TWT2; relay 6060 of selector TS2; and line relay 6055 of trunk circuit IT2. Under these conditions lamp L8 will be lit and low level tone will be transmitted to the first office.

When the calling operator removes cord CD1 from jack J1, relays 104 and 110 release. The release of relay 110 releases relays 140 and 1004. The release of relay 140 grounds conductor 164. Ground on conductor 164 effects the release of relays 201, 202, 209, 253 and the operation of relay 203. The receiver at the first office is again made selective and low level signal tone is transmitted after a definite minimum duration of high level tone over toll line TL1 or TL. High level followed by low level tone received at the second toll office operates relays 518 and 519. The operation of relay 519 operates relay 408, which thereupon removes ground from lead 670, and operates relay 403. Removal of ground from conductor 670 effects, as above described, the release of all of the operated relays of trunks TWT2 and IT2 and of selector circuit TS2.

Thus, both circuits are normal again with the following relays operated: cut-off relays 203 and 403; regeneration relays 208 and 408; receiver relays 319 and 519; remove-filter relays 318 and 518; and continuous low level signal tone being transmitted in both directions.

*Calling operator disconnects under conditions where the called office transmits continuous low level signal tone plus audible tone*

Under conditons when the called switching equipment has proceeded as far as it can and has proceeded to set up a ringing condition, or other such condition requiring a continuous low level signal frequency with audible tone superimposed thereon to be transmitted to the first office, a disconnect may be necessary. Such disconnect must be effective, therefore, under conditions when continuous low level signal tone is being transmitted from the called office and simultaneously when a different relatively low frequency signal is being transmitted therefrom.

This condition is representative of an "on-hook" signal from the called end with induction ringing superimposed thereon and is exactly the same as previously discussed under "Disconnect of calling operator before called operator answers" where no tone is being transmitted to the called end. The only difference is in the fact that the low level tone being transmitted from the called end has a relatively higher level of audible frequency superimposed upon it. The condition of the circuits before the disconnect is started, as will be remembered, is that at the calling end the following relays are operated; relay 140 of trunk circuit OT1, relay 1004 of trunk circuit TWT1, receiver relay 319, remove-filter relay 318, regeneration relay 208, marking relay 201, high level relay 202, guard-removal relay 209 and timing relay 253; the following relays are operated at the called end: relays 6003 and 6005 and 6007 of trunk circuit TWT2, relay 6060 of selector TS2, and relay 6055 of trunk circuit IT2.

Before the disconnect signal is transmitted, due to the release of the sensitivity relay 206 the receiver at the first toll office is at its full sensitivity and, due to the operation of the guard-removal relay 209 the receiver is not selective. Furthermore, blocking network 320 is effective. Due to the non-selective condition of the receiver, the presence of incoming audible tone superimposed upon the incoming low level signal tone is not effective to alter conditions at the calling end.

The disconnect at the calling end, as has been explained, releases relays 104, 110, 1004 and 140. Release of relay 140 places ground on conductor 164. Ground on conductor 164 permits generator 200 to transmit high level tone and releases relay 201. The release of relay 201 releases relay 202 but relay 253, in remaining operated, continues to permit high level signal transmission. The release of relays 201 and 202 permits relay 209 to release. The release of relay 209 permits condenser 257 to begin charging due to removal of ground from lead 260 at the No. 3 front contacts of relay 209. The release of relay 209 makes the associated receiver selective and if the audible tone is being received at that time relays 318, 319 and 208 will release because the guard channel 315 will take effect. If, when relay 209 releases, no audible tone is being received, the incoming low level signal tone will keep relays 318, 319 and 208 operated. The release of relay 202 completed at its No. 5 back contacts an operating circuit for relay 203 which, in operating, cuts and terminates the outward transmission channel. If relay 319 remains operated, relay 203 will also remain operated. If relay 319 releases, relay 203 will release to remove the cut and termination. At any rate relay 253 will time out and reinstate resistances 229 and 230 to change the high level signal tone transmitted to low level.

The high level tone reaching the called end, operating on a four-wire basis, causes the operation of relays 518 and 519 as has been explained. The operation of relay 519 operates relays 408 and 403 over conductors 527 and 412, respectively. The operation of relay 408 removes ground from conductor 670. The operation of relay 403 cuts and terminates the outward transmission path to cause the transmission of audible tone over toll line TL2 to cease. If it be assumed that, at the calling end, audible tone were present when relay 209 released to make the receiver selective and thereby to release relays 318, 319 and 203, the present cut of the outward path at the second toll office will stop transmission of that guard frequency audible tone and relays 318, 319 and 203 of the first calling office will reoperate due to the presence of low level incoming signal tone. In either case the continued operation or reoperation of relay 319 will operate relay 208 to remove ground from conductor 170. The removal of ground from lead 670 effects the return to normal of the trunk circuits TWT2 and IT2 and of selector TS2 as previously explained.

When the high level disconnect signal tone reaches the called end working on a two-wire basis, the same operations as above occur provided said signal arrives during the silent interval of the audible tone. If it arrives at the instant when said audible tone is being transmitted over the outward transmission channel comprising channel TL2', one of two situations may arise depending upon the level of said audible tone. If the audible tone is high enough in level the echo transmitted through hybrid coil HC4 to the incoming transmission channel TL1' will affect the guard channel 515 to prevent the operation of the receiver and thus the operation of relays 518, 519 and 403, until the silent period is reached where the signal channel 516 can take effect over the guard channel 515. If the audible tone is of relatively low level, the signal channel 516 under the action of the incoming high level signal tone, will take effect immediately to operate relays 518, 519 and 403 to cut the outward transmission path.

The net effect, therefore, of such audible tone will be to cause a slight delay in the release of the called end until the silent period is reached.

*Disconnect by calling operator under busy condition*

If a busy condition is encountered in extending the connection, for instance, if selector TS2 finds all trunks busy in the selected level, relay 6011 of the two-way trunk TWT2 is alternately operated and released under the control of an interrupter (not shown) thereby causing the alternate placing of battery and ground on conductor 664. Such changes in the condition of conductor 664 may be accompanied by similar on and off audible tone transmission over toll line TL2 or channel TL2' to augment the flashing signal with an audible signal. The on and off periods of the audible tone, if present, will correspond exactly at the called end to the respective periods of battery and ground on conductor 664. Under the conditions when the calling operator is awaiting the called end answer it will be remembered that no tone signal is being transmitted from the calling end and that at the calling end the following relays are operated: relays 104 and 110 and 140 of trunk circuit OT1, relay 1004 of trunk circuit TWT1, and relays 201, 202, 208, 209, 253, 318 and 319. The guard channel 315 is removed and the receiver is not selective. At the called end no relays, other than the previously described relays of trunks TWT2, and IT2 and of selector TS2, are operated and continuous low level signal tone is being transmitted to the calling end.

Since the receiver at the calling end is not selective any audible tone superimposed upon flashing signals comprising on and off conditions of signal tone frequency will have no added effect upon either receiver or either transmitter prior to disconnect unless there is a phase displacement of the two effects at the calling end which probably is the case. When relay 6011 is operated by the interrupter (not shown) for the on period of the audible tone, if any, conductor 664 is conditioned with battery representing an "off-hook" condition. Battery on conductor 664, as previously described, operates relays 401, 403 and 402 in rapid succession followed by the release of relay 403. The cut-off relay 403, as usual, during its operation cuts and terminates the outgoing transmission path to cause any audible tone transmission to cease, if it is present. Since relay 519 is not operated at this time relay 402, in operating, operates the sensitivity relay 406, and filter relay 3001 if two-wire operation is involved, in a circuit extending from ground, over the No. 6 front contacts of relay 402, over the No. 1 back contacts of the timing relay 453, over the No. 1 back contacts of the guard-removal relay 409, over the No. 1 front contacts of marking relay 401, to battery and ground through the winding of relay 406, and to battery and ground through the winding of relay 3001 over conductor 463 for two-wire operation. The operation of relay 3001 removes filter 3000 from the inward transmission path. The operation of relay 406 reduces the sensitivity of the called end receiver, increases the guard-to-signal efficiency of the receiver, opens at its No. 1 back contacts the operating circuit for relay 408, and closes at its No. 2 front contacts the operating circuit for the rering relay 464, which thereupon operates to in turn operate the out-filter relay 466 and provide relay 402 with an additional locking circuit. Furthermore, battery on conductor 664 causes cessation of signal tone transmission to the calling end.

When the cessation of low level signal tone is registered at the calling end the receiver is not selective and if any noise, such as audible tone, is present the release of the receiver relay 319, of the remove-filter relay 318 and of the regeneration relay 208 will be delayed until the noise ceases. The audible tone or noise, as above, is removed quickly by the operation of relay 403 which cut and terminated the outward path at the called end. The relay 319, in releasing, releases relay 209 which again makes the receiver selective and permits condenser 257 to acquire a charge. If any audible tone is present after relay 209 releases it will be effective through the agency of the guard channel 315 to keep the receiver and its relay 319 released. The release of relay 319 releases relay 208 which thereupon applies ground to conductor 170. Ground on conductor 170, as previously described, operates relay 105 to extinguish lamp CS.

When relay 6011 is released under the control of the interrupter (not shown) to reapply ground to conductor 664, ground on conductor 664 causes the transmission of high level tone and releases relay 401, followed by the release of relay 406 (and relay 3001 for two-wire operation). The release of relay 406, releases the slow-releasing rering relay 464 which in turn releases relays 402 and 456. The release of relay 401 caused the relay 403 to operate momentarily, until relay 402 released, thereby cutting and terminating the outward path. Thus the ground on conductor 664 caused a transmission of high level tone followed, when relay 402 released, by a period of low level tone until the end of this "on-hook" flash.

This high level tone, when received at the calling end, will cause the operation of relays 318, 319 and relay 208. The operation of relay 319 will also operate relay 209 to again make the receiver non-selective to incoming frequencies and to discharge condenser 257. Obviously, if any audible tone arrives with the high level tone the action of the receiver in operating relays 318 and 319 will be delayed slightly due to the effect of the guard channel 315. The operation of relay 208 removes ground from conductor 170 to release the relay 105 and relight the lamp CS. Thus the presence of audible tone with flashing signal tone has little, if any, material effect upon the signal receiving or transmitting circuits and no important effect upon the operation by the busy flashing signal of lamp CS.

Thus, under the condition of flashing signals either with or without audible tone the state of the signaling circuits at both ends is continuously changing.

When there is no audible tone present at the called end the circuit goes through the following cycle: at the beginning of the "off-hook" period (change from ground to battery on lead 664) the marking relay 401, the cut-off relay 403, the high level relay 402, the sensitivity relay 406 and the rering relay 464 operate in the order named followed by the release of the cut-off relay 403. When the end of the "off-hook" period arrives (change from battery back to ground on conductor 664), the marking relay 401 releases followed by the operation of the cut-off relay 403 and by the release of relays 406, 464, 402 and 403 in that order. This cycle is repeated for each "off-hook" period to transmit to the calling end "off-hook" periods comprising no signal at all followed by "on-hook" periods comprising a short spurt of high level tone followed by low level tone until the end of the "off-hook" period. At the calling end the cycle during the "off-hook" period starts later than at the called end due primarily to electronic delays in the calling end receiver and transmission time between offices. The beginning of the "off-hook" period at the calling end comprises the release of the receiver relay 319, the regeneration relay 208, the remove-filter relay 318 and the guard-removal relay 209, in that order. The end of the "off-hook" period effects the operation of the relays 318, 319, 208 and 209 in that order.

It is apparent then that disconnect from the calling end can take place under one of two conditions; namely, an "on-hook" condition similar to the condition representing an answer by the awaiting called end or an "off-hook" condition similar to an end of conversation condition.

If the condition of the circuits represents an "on-hook" situation, the disconnect at the calling end in placing ground on conductor 164 effects the disconnection of both circuits to normal exactly as in the previously described "Disconnect of calling operator before called operator answers," provided the condition lasts long enough to permit the receiver relay 519 and relay 408 at the called end to operate and to permit the switches to release at the called local office. If the "on-hook" condition at the called end remains only long enough to permit the operation of the receiver relays 519 and 408 and not the release of the switches as a result of the disconnect signal sent from the calling end before the flashing of relay 6011 reverts the called end to the "off-hook" indication, the next "off-hook" period starts at the called end represented by the reoperation of relay 6011 to place battery on conductor 664. Ground on lead 664 operates the marking relay 401 and the operation of the receiver relay 519 operates the cut-off relay 403 over conductors 412 and 411. The operation of relays 519 and 401 operates the guard-removal relay 409 over conductor 412 and the No. 3 front contacts of relay 401. The operation of relays 401 and 403 operates the high level relay 402. The operation of relays 402 and 409 operates the timing relay 453. Battery on lead 664 also, as above, causes cessation of transmission of signal tone over toll line TL2. The relay 403 is permitted to release slowly upon the operation of relay 402. The switches may release during this "off-hook" period, as a result of the operation of relay 408 to remove ground from lead 670, in which case the conductor 664 is again grounded by the release of relay 6011 to permit high level signal tone transmission to the calling end followed by release of all relays at the called end except relays 408, 519 and 518 and except the reoperation of relay 403, to again transmit normal "on-hook" low level continuous signal tone. In the meantime, at the calling end, due to the disconnect thereat effecting the grounding of conductor 164, relays 201, 209, 202 and 253 have released or are releasing. The release of relay 201 reoperates relay 203 over the No. 3 front contacts of relay 202. When relay 202 releases, relay 203 is held operated over the No. 5 back contacts of relay 202 and lead 212 to the operated relay 319, and relay 208 is held operated provided signal tone is still being received. When the high level followed by continuous low level signal tone is received, as a result of the grounding of conductor 664 by the switch release at the called end, relays 318, 319, 208 and 203 reoperate to represent a normal "on-hook" condition to the calling end. It may be possible that when the ground on conductor 170 is permanently removed by the operation of relay 208 as a result of the continuous low level signal tone incoming from the normal called end, the timing relay 253 may still be releasing. There may be a delay occasioned by the release of these relays but they will release quickly to revert the calling end to a normal "on-hook" or idle condition available to accept or initiate calls. If the switches at the called end do not release during the first "off-hook" condition at the called end, as described above, an "on-hook" condition reappears at the called end to transmit signal tone to the calling end. In the meantime, during the "off-hook" period the relays 401, 402, 409 and 453 operated and if the switches release during the following "on-hook" condition at the called end, the system action is a modification of the "Disconnect of calling operator before called operator answers," as above described, with the exception that the timing relays 253 and 453 are still releasing when the final removal of ground on the lead 170 at the calling end occurs. The delay occasioned by the release of the timing relays 253 and 453 will be no more objectionable than if the switches had released during the "off-hook" condition previously discussed.

If the condition at the called end is changing from an "on-hook" condition (ground on lead 664) to an "off-hook" condition (battery on lead 664) at the time that disconnection is started at the calling end by the release of relay 140, the high level disconnect tone is received at the called end to find that the operation of relay 408 is delayed by the operated relay 406 or is not impeded thereby, depending upon the operation of relay 519 before or after the relay 406 is operated by the "off-hook" condition of battery on lead 664. If relay 406 is operated before the incoming disconnect tone operates relays 518 and 519 to cause operation of relay 409 to thereby permit relay 406 to release slowly, there will be such a delay in operating relay 408. Nevertheless, whether the operation of relay 408 releases the switches during that particular "off-hook" or the next "on-hook," it is bound to release them at some subsequent period. The significant point is that once the receiver relay 519 has been operated the disconnect will go forward and will not take less time than under conditions when awaiting an answer at the called end and not greater time than under conditions when disconnecting against an "off-hook," or when the signals from the called end comprise a continuous low level signal tone with superimposed audible tone, as previously described.

In the case of two-wire toll line operation, under the condition of disconnect when the called end is transmitting flashing signals without audible tone, if the disconnect tone arrives at the called end just at the moment when the "on-hook" period starts to transmit signal tone over channel TL2', the operation of the receiver relay 519 may be delayed by the action of the guard channel 515 in response to the transhybrid echo of the transmitted signal tone over channel TL2', through hybrid coil HC4 and over channel TL1' to the receiver. This delay will persist until the release of relay 401 permits relays 406 and 3001 to release to increase the signal-to-guard efficiency of the receiver and to insert blocking network 3004 into the incoming transmission path. If the disconnect tone arrives at any other time the operation of relay 519 will not be delayed. Once the relay 519 operates, it operates relay 409 under control of the reoperation relay 401 quickly enough to prevent removal of the blocking network 3004 to thereby insure no intereference from local signal echoes. Thus, unless, as above explained, the disconnect tone arrives at a particular time, two-wire and four-wire operations are alike.

If audible tone is present simultaneously with the flashing report signals from the called end when disconnect is started at the calling end, the situation is not different for four-wire operation from the situation, above described, when audible tone is not present, with the slight exception that at the calling end after its receiver is made selective the operation of the receiver relay 319 is not certain in the presence of audible tone affecting the guard channel 315. For two-wire operation the receiver relay 519 at the called end may be delayed in operation not only due to transhybrid signal tone current but also due to transhybrid audible tone. The action of the signaling circuit, as previously described, in transmitting flashes, produces a period of time in both the "on-hook" (ground on lead 664) and "off-hook" (battery on lead 664) periods when the absence of such audible tone is guaranteed by the cessation of audible tone or by the operation of the cut-off relay 403. If audible tone is present, the operation of the receiver relay 519 at the called end will be delayed until the audible tone ceases or is cut off. To this extent the time required to permanently remove ground from lead 170 will be somewhat greater than the situation, above described, when disconnect is started in the face of flashing signals without audible tone.

Once the receiver relay 519 at the called end operates the disconnect will proceed to completion regardless of signal tone or audible tone or both transmitted from the called end. Obviously, under two-wire operation, the insertion of the blocking network 3004 into the inward path of the called end is of little, if any, help in eliminating the effect of audible tone since it blocks only signal frequency generated by generator 400. Nevertheless, the receiver relay 519, when it operates, operates because at that time it is not prevented from doing so by transhybrid audible or signal tone. When the relay 519 operated, the marking relay 401 was either operated or released depending upon whether the calling end was in an "off-hook" or an "on-hook" period of the flashing report signaling. If relay 401 were operated, the operation of relay 519 would operate relay 409 over conductor 412. The operation of relay 409 makes the associated receiver non-selective, by eliminating the guard channel 515 and by inserting resistance 445 in series with the signal channel 516, to thereby prevent releasing interference by audible tone. When the relay 401 releases, upon a change to ground on conductor 664 again, the cut-off relay 403 operates and remains operated over lead 412 after the high level relay 402 releases, upon the operation of relay 403 and the release of relay 401 to thereby cut off the audible tone. If the relay 401 should again reoperate, due to a change from ground to battery on lead 664, the relay 409 would be reoperated before relay 403 released. Therefore, where the audible tone is not cut off the receiver is made non-selective and when the receiver is selective the audible tone is cut off, thus preventing guard channel interference once the receiver relay 519 has operated. If the marking relay 401 was not operated when the relay 519 first operated, the relay 403 would be either operated or released. If operated, relay 403 is held so over lead 412. If released, relay 403 is operated over lead 412. In either case audible tone is cut off. Regardless of the circumstances under which the receiver relay 519 operates, audible tone will not interfere therewith.

What is claimed is:

1. In a signaling system in which the transmission of selective and supervisory signals over a telephone line is effected by impulses of alternating current of a particular frequency in the voice band, signal receiving means comprising an electronic circuit responsive to signal impulses and a relay controlled by said circuit and means in said circuit for delaying the response of said circuit to prevent its response to short impulses of said frequency occurring in speech thereby to prevent the control of said relay by said circuit, and signal transmitting means comprising a signal source and first means for connecting and disconnecting said source to and from said line to transmit impulses thereover and second means controlling said first means and operable to effect the transmission of intentional signals and relay means associated with said transmitting means and automatically effective at times under the control of said second means to increase the interval during which said source is connected to said line to insure its connection thereto for a sufficient length of time to insure the response by said circuit to intentional signals so as to insure the operation of said signal receiving relay.

2. In a signaling system in which the transmission of selective and supervisory sivnals over a telephone line is effected by impulses of alternating current of a particular frequency in the voice band, signal receiving means comprising an electronic circuit responsive to signal impulses and a relay controlled by said circuit and means within said circuit for delaying the response thereby to impulses of said signal frequency less than a prescribed first minimum duration and further means associated with said relay for preventing the control of said relay by said circuit in response of said circuit to signal frequency impulses of longer duration than said minimum but less than a prescribed second minimum duration, and signal transmitting means comprising a signal source and first means for connecting and disconnecting said source to and from said line and second means controlling said first means and operable to effect the transmission of intentional signals and relay means associated with said transmitting means and automatically effective at times under the control of said second means to increase the interval during which said source is connected to said line to insure its connection thereto for a length of time greater than the said prescribed second minimum duration.

3. In a signaling system in which the transmission of selective and supervisory signals over a telephone line is effected by impulses of alternating current of a particular frequency in the voice band, signal receiving means comprising an electronic circuit responsive to signal impulses and a slow operating relay controlled by said circuit and means within said circuit for delaying the response thereby to impulses of said signal frequency less than a prescribed first minimum duration and further means comprising said slow operating characteristic of said relay for preventing the operation of said relay by said circuit in response to signal frequency impulses of longer duration than said minimum but less than a prescribed second minimum duration, and signal transmitting means comprising a signal source and first means for connecting and disconnecting said source to and from said line and second means controlling said first means and operable to effect the transmission of intentional signals and relay means associated with said transmitting means and automatically effective at times under the control of said second means to increase the interval during which said source is connected to said line to insure its connection thereto for a length of time greater than the said prescribed second minimum duration.

4. In a signaling system in which the transmission of selective and supervisory signals over a telephone line is effected by impulses of alternating current of a particular frequency in the voice band, signal receiving means comprising an electronic circuit responsive to voice frequency impulses, circuit means associated with said electronic circuit for delaying the response of said electronic circuit to all voice frequency impulses, and other circuit means associated with said electronic circuit and including a relay controlled by said electronic circuit for at times automatically compensating for such delay by extending the duration of the response of said electronic circuit beyond the termination of said impulses.

5. In a signaling system in which the transmission of selective and supervisory signals over a telephone line is effected by impulses of alternating current of a particular frequency in the voice band, signal receiving means comprising an electronic circuit responsive to voice frequency impulses, a frequency discriminating network energizing two condensers, one condenser arranged to acquire a charge in response to signal impulses containing said particular frequency and the other condenser arranged to acquire a charge in response to signal impulses containing voice frequencies other than said particular frequency, a common discharging circuit for said two condensers arranged to delay the response of said electronic circuit in accordance with the sum of the respective discharge currents of said condensers, circuit means in said common discharge path responsive to transient conditions of said signal impulses for further delaying the response of said electronic circuit, and additional circuit means associated with said electronic circuit and associable with said common discharge path and including a third condenser controlled by said electronic circuit for at times automatically compensating for such further delay.

6. In a signaling system in which the transmission of selective and supervisory signals over a telephone line is effected by impulses of alternating current of a particular frequency in the voice band, signal receiving means comprising an electronic circuit responsive to voice frequency impulses, a frequency discriminating network energizing two condensers, one condenser arranged to acquire a charge in response to signal impulses containing said particular frequency and the other condenser arranged to acquire a charge in response to signal impulses containing voice frequencies other than said particular frequency, a common discharging circuit for said two condensers arranged to delay the response of said electronic circuit in accordance with the sum of the respective discharge currents of said condensers, circuit means in said common discharge path responsive to transient conditions of said signal impulses to momentarily reduce the time constant of said common discharge path for further delaying the response of said electronic circuit, and additional circuit means associated with said electronic circuit and including a third condenser and a relay for controlling said third condenser, said relay controlled by said electronic circuit for at times automatically compensating for such further delay by paralleling said third condenser with one of the said two condensers to increase the time constant of said common discharge path.

WALTER W. FRITSCHI.
CHARLES W. LUCEK.

REFERENCES CITED

The following references are of record in the file of this patent:

UNITED STATES PATENTS

| Number | Name | Date |
|---|---|---|
| 1,949,136 | Adair | Feb. 27, 1934 |
| 2,124,027 | Calhoun | July 19, 1938 |
| 2,304,871 | Andrews | Dec. 15, 1942 |
| 2,367,518 | Newby | Jan. 16, 1945 |
| 2,388,347 | Staples et al. | Nov. 6, 1945 |
| 2,468,305 | Newell | Apr. 26, 1949 |